US009061681B2

(12) United States Patent
Yoshida et al.

(10) Patent No.: US 9,061,681 B2
(45) Date of Patent: Jun. 23, 2015

(54) CONTROL DEVICE

(75) Inventors: Takashi Yoshida, Nishio (JP); Yomei Hakumura, Susono (JP); Yoichi Tajima, Anjo (JP); Hideya Kawai, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/112,733

(22) PCT Filed: Jul. 6, 2012

(86) PCT No.: PCT/JP2012/067376
§ 371 (c)(1),
(2), (4) Date: Oct. 18, 2013

(87) PCT Pub. No.: WO2013/005844
PCT Pub. Date: Jan. 10, 2013

(65) Prior Publication Data
US 2014/0045649 A1 Feb. 13, 2014

(30) Foreign Application Priority Data

Jul. 6, 2011 (JP) ................................ 2011-150169
Jul. 19, 2011 (JP) ................................ 2011-157992
Jan. 25, 2012 (JP) ................................ 2012-013257

(51) Int. Cl.
B60L 15/20 (2006.01)
B60W 20/00 (2006.01)
(Continued)

(52) U.S. Cl.
CPC ............... *B60W 20/10* (2013.01); *Y10T 477/26* (2015.01); *Y10T 477/753* (2015.01); *B60K 6/48* (2013.01);
(Continued)

(58) Field of Classification Search
CPC ..... B60W 20/10; B60W 10/02; B60W 10/06; B60W 10/08; B60K 6/48; B60K 6/547; B60L 15/20; B60L 15/2054; B60L 11/14; Y10T 477/26; Y10T 477/753
USPC ............... 477/5, 6, 175, 176, 180; 701/22, 68
See application file for complete search history.

(56) References Cited

U.S. PATENT DOCUMENTS 6,524,219 B2  2/2003  Mesiti et al.
7,131,510 B2  11/2006 Mesiti et al.
(Continued)

FOREIGN PATENT DOCUMENTS

JP  A-2003-284285  10/2003
JP  A-2006-306209  11/2006
(Continued)

OTHER PUBLICATIONS

Aug. 14, 2012 International Search Report issued in International Patent Application No. PCT/JP2012/067375; with English-language translation.
(Continued)

*Primary Examiner* — Roger Pang
(74) *Attorney, Agent, or Firm* — Oliff PLC

(57) ABSTRACT

The present invention relates to a control device that controls a vehicle drive device in which a rotary electric machine is provided in a power transfer path that connects between an internal combustion engine and wheels and in which a first friction engagement device is provided between the internal combustion engine and the rotary electric machine and a second friction engagement device is provided between the rotary electric machine and the wheels.

12 Claims, 6 Drawing Sheets

(51) Int. Cl.
  *B60K 6/48* (2007.10)
  *B60L 11/14* (2006.01)
  *B60W 10/02* (2006.01)
  *B60W 10/06* (2006.01)
  *B60W 10/08* (2006.01)
  *B60K 6/547* (2007.10)

(52) U.S. Cl.
  CPC ............... *B60L 11/14* (2013.01); *B60W 10/02* (2013.01); *B60W 10/06* (2013.01); *B60W 10/08* (2013.01); *B60W 20/00* (2013.01); *B60W 2510/081* (2013.01); *B60W 2710/023* (2013.01); *B60W 2710/025* (2013.01); *B60W 2710/027* (2013.01); *B60W 2710/081* (2013.01); *B60W 2710/083* (2013.01); *B60W 20/40* (2013.01); *B60W 20/20* (2013.01); *B60K 2006/4825* (2013.01); *Y02T 10/6221* (2013.01); *Y02T 10/6286* (2013.01); *Y02T 10/6252* (2013.01); *B60L 15/20* (2013.01); *B60L 15/2054* (2013.01); *Y02T 10/7077* (2013.01); *B60Y 2300/429* (2013.01); *B60K 6/547* (2013.01); *Y10S 903/93* (2013.01); *Y02T 10/7275* (2013.01); *Y02T 10/70* (2013.01)

(56) References Cited

U.S. PATENT DOCUMENTS

| | | | |
|---|---|---|---|
| 7,160,225 B2 | 1/2007 | Berger et al. | |
| 7,347,803 B2 | 3/2008 | Kobayashi et al. | |
| 7,351,182 B2 | 4/2008 | Kobayashi | |
| 7,370,715 B2 | 5/2008 | Colvin et al. | |
| 7,472,769 B2 * | 1/2009 | Yamanaka et al. | 180/65.25 |
| 7,762,922 B2 | 7/2010 | Dreibholz et al. | |
| 7,770,678 B2 | 8/2010 | Nozaki et al. | |
| 7,784,575 B2 | 8/2010 | Yamanaka et al. | |
| 7,874,956 B2 | 1/2011 | Kouno | |
| 7,878,281 B2 | 2/2011 | Tanishima | |
| 7,892,139 B2 | 2/2011 | Kaltenbach | |
| 7,975,791 B2 | 7/2011 | Nozaki et al. | |
| 8,047,959 B2 | 11/2011 | Fuechtner et al. | |
| 8,065,047 B2 | 11/2011 | Hasegawa et al. | |
| 8,142,328 B2 | 3/2012 | Reuschel | |
| 8,192,324 B2 | 6/2012 | Kraska et al. | |
| 8,246,509 B2 | 8/2012 | Mittelberger et al. | |
| 8,292,779 B2 | 10/2012 | Kaltenbach et al. | |
| 8,298,117 B2 | 10/2012 | Seel et al. | |
| 8,388,494 B2 | 3/2013 | Schiele et al. | |
| 8,430,790 B2 | 4/2013 | Kobayashi et al. | |
| 8,465,393 B2 | 6/2013 | Lemp et al. | |
| 8,475,329 B2 | 7/2013 | Sah | |
| 2007/0056784 A1 | 3/2007 | Joe et al. | |
| 2007/0080005 A1 | 4/2007 | Joe | |
| 2007/0272456 A1 | 11/2007 | Shiiba | |
| 2007/0275823 A1 * | 11/2007 | Motosugi et al. | 477/176 |
| 2010/0056328 A1 | 3/2010 | Schenk et al. | |
| 2011/0118078 A1 * | 5/2011 | Kraska et al. | 477/5 |
| 2012/0122630 A1 | 5/2012 | Huber et al. | |
| 2012/0232732 A1 | 9/2012 | Tsuda et al. | |
| 2013/0012353 A1 | 1/2013 | Yoshida et al. | |
| 2013/0053214 A1 | 2/2013 | Kawai et al. | |
| 2013/0296104 A1 * | 11/2013 | Nefcy | 477/5 |
| 2014/0195082 A1 * | 7/2014 | Takamura et al. | 701/22 |

FOREIGN PATENT DOCUMENTS

| | | |
|---|---|---|
| JP | A-2007-99141 | 4/2007 |
| JP | A-2010-70138 | 4/2010 |
| JP | A-2010-149640 | 7/2010 |
| JP | A-2010-188788 | 9/2010 |
| JP | A-2010-201962 | 9/2010 |

OTHER PUBLICATIONS

Aug. 28, 2012 International Search Report issued in PCT/JP2012/069166 (with translation).

The whole prosecution of U.S. Appl. No. 13/565,296 is incorporated herein by reference.

The whole prosecution of U.S. Appl. No. 13/539,946 is incorporated herein by reference.

International Search Report issued in International Patent Application No. PCT/JP2012/067376 dated Aug. 14, 2012.

* cited by examiner

United States Patent
US 9,061,681 B2

CONTROL DEVICE

INCORPORATION BY REFERENCE

The disclosure of Japanese Patent Application No. 2011-157992 filed on Jul. 19, 2011, Japanese Patent Application No. 2011-150169 filed on Jul. 6, 2011, Japanese Patent Application No. 2012-013257 filed on Jan. 25, 2012 including the specification, drawings and abstract is incorporated herein by reference in its entirety.

BACKGROUND OF THE INVENTION

The present invention relates to a control device that controls a vehicle drive device in which a rotary electric machine is provided in a power transfer path that connects between an internal combustion engine and wheels and in which a first friction engagement device is provided between the internal combustion engine and the rotary electric machine and a second friction engagement device is provided between the rotary electric machine and the wheels.

DESCRIPTION OF THE RELATED ART

A device described in Japanese Patent Application Publication No. 2010-149640 (JP 2010-149640 A) is already known as an example of the control device that controls a vehicle drive device described above. Hereinafter, in the description in the "Description of the Related Art" section, reference numerals used in JP 2010-149640 A (and the names of corresponding members as necessary) are cited in brackets for description. The control device is configured to execute internal combustion engine start control in which the internal combustion engine [engine E] is started using torque of the rotary electric machine [motor MG] by bringing the first friction engagement device [first clutch CL1] into a direct engagement state from a state in which the internal combustion engine is stopped and the first friction engagement device is disengaged. When the internal combustion engine start control is executed, rotational speed feedback control in which the rotational speed of the rotary electric machine is caused to coincide with a target rotational speed is executed. In this event, a target transfer torque capacity [target clutch transfer torque command TCL2] for the second friction engagement device [second clutch CL2] in the speed change mechanism [automatic transmission AT] is controlled such that the second friction engagement device transfers predetermined torque in a slip engagement state.

The control device according to JP 2010-149640 A is configured to decide the target transfer torque capacity for the second friction engagement device on the basis of a difference [torque deviation amount ΔT] between actual torque of the rotary electric machine and maximum torque that can be output from the rotary electric machine, or a difference in rotational speed [rotational speed difference ΔN] between engagement members on both sides of the second friction engagement device. This allows to suppress torque fluctuations due to an error in transfer torque capacity of the second friction engagement device by optimizing the slipping (slip) state of the second friction engagement device.

SUMMARY OF THE INVENTION

In the device according to JP 2010-149640 A, however, the control for deciding the target transfer torque capacity for the second friction engagement device described above is only executed in a period in which the first friction engagement device is in the slip engagement state, and is not executed after the first friction engagement device is brought into the direct engagement state. In the device according to JP 2010-149640 A, the first friction engagement device is controlled to a predetermined transfer torque capacity to be brought into the slip engagement state. Therefore, in the case where there is an error in transfer torque capacity of the first friction engagement device, a torque difference may be caused in torque transferred to the wheels via the second friction engagement device when the second friction engagement device is brought from the slip engagement state into the direct engagement state and the rotational speed feedback control for the rotary electric machine is terminated to start torque control for the rotary electric machine. This may cause occupants of the vehicle to feel a shock. Such an issue is not only caused in the case where the first friction engagement device is brought into the slip engagement state to start the internal combustion engine, but also in the case where the first friction engagement device is brought into the slip engagement state during operation of the internal combustion engine. Even in the case where the first friction engagement device is in the direct engagement state and is not slipping, in addition, a similar issue may be caused in the case where there is an error in output torque of the internal combustion engine.

In view of the foregoing, it is desired to provide a control device that can suppress a torque difference caused when the second friction engagement device is brought from the slip engagement state into the direct engagement state irrespective of an error in torque of the internal combustion engine or an error in transfer torque capacity of the first friction engagement device.

According to an aspect of the present invention, a control device controls a vehicle drive device in which a rotary electric machine is provided in a power transfer path that connects between an internal combustion engine and wheels and in which a first friction engagement device is provided between the internal combustion engine and the rotary electric machine and a second friction engagement device is provided between the rotary electric machine and the wheels. The control device executes rotational state control in which a rotational state of the rotary electric machine is controlled such that a target rotational state is established with torque of the internal combustion engine transferred to the wheels while a hydraulic pressure supplied to the first friction engagement device is controlled such that a rotational state of the internal combustion engine coincides with a target rotational state with both the first friction engagement device and the second friction engagement device in a slip engagement state, or with torque of the internal combustion engine transferred to the wheels with the first friction engagement device in a direct engagement state and with the second friction engagement device in a slip engagement state; and the control device executes hydraulic pressure regulation control in which a hydraulic pressure supplied to the second friction engagement device in the slip engagement state is controlled on the basis of torque of the rotary electric machine produced during the rotational state control while the second friction engagement device is transitioned from the slip engagement state to a direct engagement state.

The term "rotary electric machine" refers to any of a motor (electric motor), a generator (electric generator), and a motor generator that functions both as a motor and as a generator as necessary.

The term "slip engagement state" means a state in which two engagement members to be engaged with each other by the subject friction engagement device are engaged with each other with a rotational speed difference so as to transfer a drive force between each other. The term "direct engagement state" means a state in which the two engagement members are engaged with each other so as to rotate together with each other. The "disengaged state" means a state in which no rotation or drive force is transferred between the two engagement members.

The term "rotational state" is used to include a rotational position, a rotational speed, and a rotational acceleration. Thus, the term "rotational state control" includes rotational position feedback control in which the rotational position of the subject to be controlled is controlled such that a target rotational position is established, rotational speed feedback control in which the rotational speed of the subject to be controlled is controlled such that a target rotational speed is established, rotational acceleration feedback control in which the rotational acceleration of the subject to be controlled is controlled such that a target rotational acceleration is established, and so forth.

With the hydraulic pressure supplied to the first friction engagement device controlled such that the rotational state of the internal combustion engine coincides with the target rotational state with the first friction engagement device in the slip engagement state, or with the first friction engagement device in the direct engagement state, as in the configuration described above, torque of the internal combustion engine can be transferred as it is to the rotary electric machine side via the first friction engagement device. That is, torque of the internal combustion engine that is not affected by an error in transfer torque capacity of the first friction engagement device can be transferred to the rotary electric machine side. Here, in the case where there is an error in output torque of the internal combustion engine, the rotational state of the rotary electric machine does not temporarily coincide with the target rotational state because of the error. By executing the rotational state control, however, the output torque of the rotary electric machine is sequentially increased and decreased so that the rotational state of the rotary electric machine coincides with the target rotational state. When the second friction engagement device is transitioned from the slip engagement state to the direct engagement state in this state, the rotational speed of the rotary electric machine is defined uniquely in accordance with the rotational speed of the wheels, and the rotary electric machine outputs predetermined torque. In this event, a torque difference matching the difference between the output torque produced during the rotational state control and the predetermined torque produced after the second friction engagement device is transitioned to the direct engagement state may be caused in torque transferred to the wheels around the transition in state of the second friction engagement device.

In this respect, according to the configuration described above, the output torque of the rotary electric machine produced during the rotational state control can be caused to approach the predetermined torque produced after the second friction engagement device is transitioned to the direct engagement state by appropriately controlling the hydraulic pressure to be supplied to the second friction engagement device in the hydraulic pressure regulation control on the basis of the output torque. Hence, a torque difference caused when the second friction engagement device is transitioned from the slip engagement state to the direct engagement state can be suppressed.

Here, the control device may further execute target torque decision control in which target torque for the rotary electric machine is decided on the basis of a difference between a required drive force for driving the wheels and torque transferred from the internal combustion engine to the rotary electric machine; the control device may execute as the rotational state control rotational speed feedback control in which a rotational speed of the rotary electric machine is controlled so as to coincide with a target rotational speed by adding correction torque to the target torque; and the control device may execute the hydraulic pressure regulation control on the basis of the required drive force and the correction torque for the rotational speed feedback control.

In one form of a control scheme for the rotary electric machine, as in the configuration, the target torque decision control and the rotational speed feedback control can be combined with each other. In this case, the rotary electric machine is controlled on the basis of the target torque decided through execution of the target torque decision control and the correction torque added to the target torque through execution of the rotational speed feedback control. According to the configuration, operation of the rotary electric machine can be controlled with high following performance.

In addition, in one form of a control scheme for the second friction engagement device, as in the configuration, control for the supplied hydraulic pressure performed on the basis of the required drive force and control for the supplied hydraulic pressure performed on the basis of the correction torque for the rotational speed feedback control can be combined with each other. By executing the hydraulic pressure regulation control on the basis of both the required drive force and the correction torque for the rotational speed feedback control, operation of the second friction engagement device can be controlled with high following performance, and occurrence of a torque difference can be effectively suppressed.

In addition, the control device may execute the hydraulic pressure regulation control on the basis of the correction torque calculated with exclusion of an amount corresponding to rotation-varying torque for the rotary electric machine for varying the rotational speed of the rotary electric machine toward the target rotational speed in the rotational speed feedback control.

The correction torque to be added to the target torque for the rotary electric machine in the rotational speed feedback control may include rotation-varying torque (inertia torque) for varying the rotational speed of the rotary electric machine toward the target rotational speed, besides torque for compensation for an error in torque of the internal combustion engine.

In the configuration described above, in view of this respect, the correction torque is calculated with the exclusion of an amount corresponding to the rotation-varying torque. Thus, the hydraulic pressure to be supplied to the second friction engagement device can be decided appropriately with a steady error due to an error in torque of the internal combustion engine reflected in the hydraulic pressure regulation control, which allows to effectively suppress occurrence of a torque difference.

In addition, in the hydraulic pressure regulation control, a target transfer torque capacity for the second friction engagement device may be decided on the basis of a value computed by integrating the correction torque over time, and the hydraulic pressure supplied to the second friction engagement device may be decided on the basis of the target transfer torque capacity.

By deciding the target transfer torque capacity for the second friction engagement device as in the configuration, the correction torque can be gradually reduced to become zero in the course of time. Hence, a torque difference caused around the transition of the second friction engagement device from the slip engagement state to the direct engagement state can be effectively suppressed.

In addition, although the transfer torque capacity of the second friction engagement device is varied by performing the hydraulic pressure regulation control, the transfer torque capacity of the second friction engagement device can be varied gradually by gradually reducing the correction torque. Thus, it is possible to suppress an uncomfortable feeling to be given to a driver of the vehicle because of abrupt variations in drive force transferred to the wheels along with variations in transfer torque capacity of the second friction engagement device.

In the case where the second friction engagement device is brought from the slip engagement state into the direct engagement state and control for the rotary electric machine is transitioned from the rotational speed feedback control to the torque control, the correction torque produced in the rotational speed feedback control is momentarily canceled, and the rotary electric machine outputs the target torque decided through execution of the target torque decision control. At this time, a torque difference with a magnitude corresponding to the correction torque may be caused in torque transferred to the wheels around the transition in engagement state of the second friction engagement device as discussed above.

In view of this respect, the aspect of the present invention can be suitably applied to a configuration in which: the control device may further execute torque control in which output torque of the rotary electric machine is controlled so as to coincide with the target torque; and in the case where it is determined during execution of the hydraulic pressure regulation control that the second friction engagement device has been brought into the direct engagement state, control for the rotary electric machine may be transitioned from the rotational speed feedback control to the torque control. With this configuration, a torque difference caused around the transition in engagement state of the second friction engagement device can be effectively suppressed.

In addition, in the case where the correction torque has not become zero when it is determined that the second friction engagement device has been brought into the direct engagement state, the control device executes transition torque control in which the output torque of the rotary electric machine is gradually varied from torque produced during the rotational speed feedback control to the target torque along with the transition from the rotational speed feedback control to the torque control.

According to the configuration, occurrence of a torque difference can be suppressed by gradually varying torque of the rotary electric machine to the target torque by gradually reducing the correction torque through the transition torque control even in the case where the second friction engagement device is brought into the direct engagement state when the correction torque produced in the rotational speed feedback control is not zero.

In addition, the hydraulic pressure regulation control may be executed in a predetermined period at and before a time at which the second friction engagement device is transitioned from the slip engagement state to the direct engagement state, the predetermined period including the time of the transition.

According to the configuration, a torque difference caused at the time of the transition of the second friction engagement device from the slip engagement state to the direct engagement state can be effectively suppressed through the hydraulic pressure regulation control executed in the predetermined period at and before the time of the transition.

In addition, the control device may execute the hydraulic pressure regulation control continuously in a period after the second friction engagement device is brought into the slip engagement state and before the second friction engagement device is transitioned to the direct engagement state.

According to the configuration, a torque difference caused at the time of the transition in engagement state of the second friction engagement device can be effectively suppressed through the hydraulic pressure regulation control executed all over the period after the second friction engagement device is brought into the slip engagement state and before the second friction engagement device is transitioned to the direct engagement state.

In addition, in the hydraulic pressure regulation control, a target transfer torque capacity for the second friction engagement device may be decided on the basis of torque of the rotary electric machine necessary to cause the rotational state of the rotary electric machine during the rotational state control to coincide with the target rotational state, and the hydraulic pressure supplied to the second friction engagement device may be decided on the basis of the target transfer torque capacity.

According to the configuration, the hydraulic pressure supplied to the second friction engagement device during the hydraulic pressure regulation control can be decided appropriately on the basis of the target transfer torque capacity for the second friction engagement device which is decided on the basis of torque necessary to cause the rotational state of the rotary electric machine during the rotational state control to coincide with the target rotational state. By deciding the target transfer torque capacity for the second friction engagement device as in the configuration, in addition, it is possible to gradually reduce torque necessary to cause the rotational state of the rotary electric machine to coincide with the target rotational state. That is, the output torque of the rotary electric machine produced during the rotational state control can be caused to approach the predetermined torque produced after the second friction engagement device is transitioned to the direct engagement state. Hence, a torque difference caused around the transition of the second friction engagement device from the slip engagement state to the direct engagement state can be effectively suppressed. Further, although the transfer torque capacity of the second friction engagement device is varied by performing the hydraulic pressure regulation control, the transfer torque capacity of the second friction engagement device can be varied gradually by gradually reducing torque necessary to cause the rotational state of the rotary electric machine to coincide with the target rotational state. Thus, it is possible to suppress an uncomfortable feeling to be given to a driver of the vehicle because of abrupt variations in drive force transferred to the wheels along with variations in transfer torque capacity of the second friction engagement device.

DETAILED DESCRIPTION OF THE EMBODIMENTS

Figure 1:
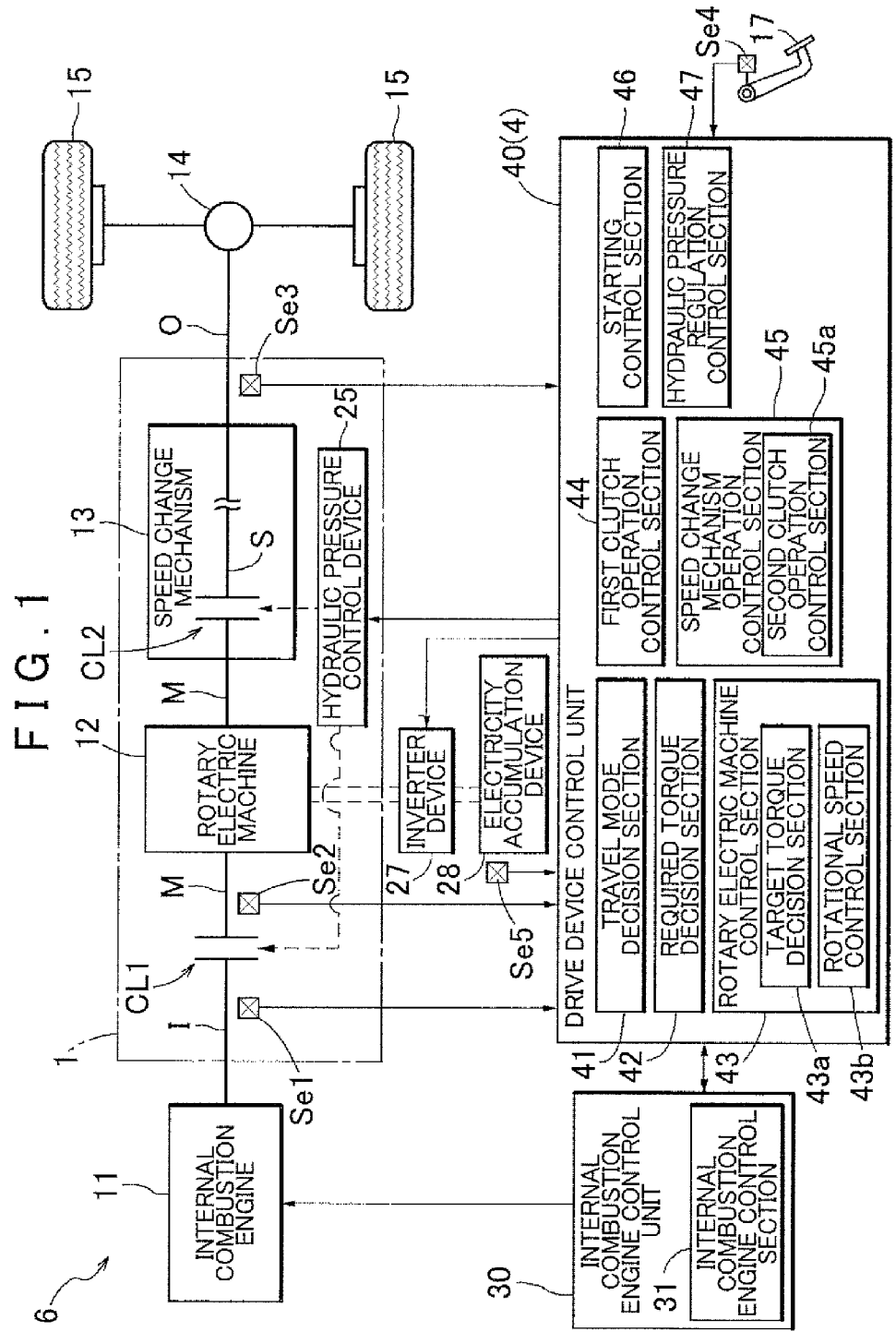
FIG. 1 is a schematic diagram showing a schematic configuration of a vehicle drive device and a control device for the vehicle drive device according to an embodiment.

A control device according to an embodiment of the present invention will be described with reference to the drawings. As shown in FIG. 1, a control device 4 according to the embodiment is a drive device control unit that controls a drive device 1. Here, the drive device 1 according to the embodiment is a vehicle drive device (hybrid vehicle drive device) that drives a vehicle (hybrid vehicle) 6 that includes both an internal combustion engine 11 and a rotary electric machine 12 as drive force sources for wheels 15. The control device 4 according to the embodiment will be described in detail below.

In the following description, the term "drivably coupled" means a state in which two rotary elements are coupled to each other in such a way that allows transfer of a drive force, which includes a state in which the two rotary elements are coupled to each other to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain. Here, the term "drive force" is used as a synonym for "torque".

The term "engagement pressure" refers to a pressure at which an engagement member on one side of a friction engagement device and an engagement member on the other side of the friction engagement device are pressed against each other. The term "disengagement pressure" refers to a pressure at which the friction engagement device is steadily brought into a disengaged state. The term "disengagement boundary pressure" refers to a pressure (disengagement-side slip boundary pressure) at which the friction engagement device is brought into a slip boundary state between the disengaged state and the slip engagement state. The term "engagement boundary pressure" refers to a pressure (engagement-side slip boundary pressure) at which the friction engagement device is brought into a slip boundary state between the slip engagement state and the direct engagement state. The term "complete engagement pressure" refers to a pressure at which the friction engagement device is steadily brought into the direct engagement state.

1. Configuration of Drive Device

The configuration of the drive device 1 to be controlled by the control device 4 according to the embodiment will be described. The drive device 1 according to the embodiment is formed as a drive device for a hybrid vehicle of a so-called one-motor parallel type. As shown in FIG. 1, the drive device 1 includes the rotary electric machine 12 provided on a power transfer path that connects between an input shaft I drivably coupled to the internal combustion engine 11 and an output shaft O drivably coupled to the wheels 15, and a speed change mechanism 13 provided between the rotary electric machine 12 and the output shaft O. A first clutch CL1 is provided between the input shaft I and the rotary electric machine 12. As discussed later, the speed change mechanism 13 includes a second clutch CL2 for shifting that is separate from the first clutch CL1. Thus, the drive device 1 includes the first clutch CL1, the rotary electric machine 12, and the second clutch CL2, which are provided in the power transfer path that connects between the input shaft I and the output shaft O and which are arranged in this order from the side of the internal combustion engine 11 and the input shaft I. These components are housed in a drive device case (not shown).

The internal combustion engine 11 is a motor driven by combusting fuel inside the engine to take out power. A gasoline engine, a diesel engine, or the like may be used as the internal combustion engine 11, for example. The internal combustion engine 11 is drivably coupled to the input shaft I so as rotate together with the input shaft I. In the example, an output shaft, such as a crankshaft, of the internal combustion engine 11 is drivably coupled to the input shaft I. The internal combustion engine 11 is drivably coupled to the rotary electric machine 12 via the first clutch CL1.

The first clutch CL1 can release drivable coupling between the internal combustion engine 11 and the rotary electric machine 12. The first clutch CL1 is a clutch that selectively drivably couples the input shaft I and an intermediate shaft M and the output shaft O to each other, and functions as a clutch for disconnection of the internal combustion engine. A wet multi-plate clutch, a dry single-plate clutch, or the like may be used as the first clutch CL1. In the embodiment, the first clutch CL1 corresponds to the "first friction engagement device" according to the present invention.

The rotary electric machine 12 includes a rotor and a stator (not shown), and can function both as a motor (electric motor) that is supplied with electric power to generate power and as a generator (electric generator) that is supplied with power to generate electric power. The rotor of the rotary electric machine 12 is drivably coupled to the intermediate shaft M so as to rotate together with the intermediate shaft M. The rotary electric machine 12 is electrically connected to an electricity accumulation device 28 via an inverter device 27. A battery, a capacitor, or the like may be used as the electricity accumulation device 28. The rotary electric machine 12 receives electric power supplied from the electricity accumulation device 28 for power running, or supplies electric power generated using torque output from the internal combustion engine 11 or an inertial force of the vehicle 6 to the electricity accumulation device 28 to accumulate the electric power in the electricity accumulation device 28. The intermediate shaft M is drivably coupled to the speed change mechanism 13. That is, the intermediate shaft M, which is an output shaft (rotor output shaft) of the rotor of the rotary electric machine 12, serves as an input shaft (transmission input shaft) of the speed change mechanism 13.

In the embodiment, the speed change mechanism 13 is a stepped automatic transmission that enables switching between a plurality of shift speeds with different speed ratios. In order to provide the plurality of shift speeds, the speed change mechanism 13 includes a gear mechanism such as a planetary gear mechanism, and a plurality of friction engagement devices, such as clutches and brakes, that engage and disengage rotary elements of the gear mechanism to switch between the shift speeds. Here, the speed change mechanism 13 includes the second clutch CL2 serving as one of the plurality of friction engagement devices for shifting. In the embodiment, the second clutch CL2 is formed as a wet multi-plate clutch. The second clutch CL2 selectively drivably couples the intermediate shaft M and a transmission intermediate shaft S provided in the speed change mechanism 13 to each other. In the embodiment, the second clutch CL2 corresponds to the "second friction engagement device" according to the present invention. The transmission intermediate shaft S is drivably coupled to the output shaft O via other clutches or shaft members in the speed change mechanism 13.

The speed change mechanism 13 transfers rotation of the intermediate shaft M to the output shaft O with the rotational speed of the intermediate shaft M changed on the basis of a predetermined speed ratio set for each shift speed established in accordance with the engagement state of the plurality of clutches etc. and with torque converted. The torque transferred from the speed change mechanism 13 to the output shaft O is distributed and transferred to the two, left and right, wheels 15 via an output differential gear device 14. This allows the drive device 1 to transfer torque of one or both of the internal combustion engine 11 and the rotary electric machine 12 to the wheels 15 to drive the vehicle 6.

In the embodiment, the drive device 1 includes an oil pump (not shown) drivably coupled to the intermediate shaft M. The oil pump functions as a hydraulic pressure source that supplies oil to various components of the drive device 1. The oil pump is actuated by being driven by a drive force of one or both of the rotary electric machine 12 and the internal combustion engine 11 to generate a hydraulic pressure. The oil from the oil pump is regulated to a predetermined hydraulic pressure by a hydraulic pressure control device 25 to be supplied to the first clutch CL1, the second clutch CL2, etc. Besides the oil pump described above, an oil pump that includes a dedicated drive motor may also be provided.

As shown in FIG. 1, a plurality of sensors Se1 to Se5 are provided in various portions of the vehicle 6 incorporating the drive device 1. The input shaft rotational speed sensor Se1 is a sensor that detects the rotational speed of the input shaft I. The rotational speed of the input shaft I detected by the input shaft rotational speed sensor Se1 is equal to the rotational speed of the internal combustion engine 11. The intermediate shaft rotational speed sensor Se2 is a sensor that detects the rotational speed of the intermediate shaft M. The rotational speed of the intermediate shaft M detected by the intermediate shaft rotational speed sensor Se2 is equal to the rotational speed of the rotor of the rotary electric machine 12. The output shaft rotational speed sensor Se3 is a sensor that detects the rotational speed of the output shaft O. The control device 4 can also derive the vehicle speed, at which the vehicle 6 is driven, on the basis of the rotational speed of the output shaft O detected by the output shaft rotational speed sensor Se3.

The accelerator operation amount detection sensor Se4 is a sensor that detects the amount of operation of an accelerator pedal 17 to detect the accelerator operation amount. The charge state detection sensor Se5 is a sensor that detects the state of charge (SOC). The control device 4 can also derive the amount of electric power accumulated in the electricity accumulation device 28 on the basis of the SOC detected by the charge state detection sensor Se5. Information indicating the detection results of the sensors Set to Se5 is output to the control device 4.

2. Configuration of Control Device

The configuration of the control device 4 according to the embodiment will be described. As shown in FIG. 1, the control device 4 according to the embodiment includes a drive device control unit 40. The drive device control unit 40 mainly controls the rotary electric machine 12, the first clutch CL1, and the speed change mechanism 13. Besides the drive device control unit 40, the vehicle 6 also includes an internal combustion engine control unit 30 that mainly controls the internal combustion engine 11.

The internal combustion engine control unit 30 and the drive device control unit 40 are configured to exchange information between each other. Various functional sections provided in the internal combustion engine control unit 30 and the drive device control unit 40 are also configured to exchange information between each other. The internal combustion engine control unit 30 and the drive device control unit 40 are also configured to acquire information indicating the detection results of the sensors Se1 to Se5.

The internal combustion engine control unit 30 includes an internal combustion engine control section 31. The internal combustion engine control section 31 is a functional section that controls operation of the internal combustion engine 11. The internal combustion engine control section 31 decides target torque and a target rotational speed for the internal combustion engine 11 as control targets for output torque (internal combustion engine torque Te) and the rotational speed of the internal combustion engine 11, and drives the internal combustion engine 11 in accordance with the decided control targets. In the embodiment, the internal combustion engine control section 31 can switch control for the internal combustion engine 11 between torque control and rotational speed control in accordance with the travel state of the vehicle 6. In the torque control, a command for the target torque is provided to the internal combustion engine 11 to make the internal combustion engine torque Te coincide with (follow) the target torque. In the rotational speed control, a command for the target rotational speed is provided to the internal combustion engine 11 to decide output torque such that the rotational speed of the internal combustion engine 11 coincides with the target rotational speed.

The drive device control unit 40 includes a travel mode decision section 41, a required torque decision section 42, a rotary electric machine control section 43, a first clutch operation control section 44, a speed change mechanism operation control section 45, a starting control section 46, and a hydraulic pressure regulation control section 47.

The travel mode decision section 41 is a functional section that decides a travel mode of the vehicle 6. The travel mode decision section 41 decides the travel mode to be established by the drive device 1 on the basis of, for example, the vehicle speed derived on the basis of the results of detection performed by the output shaft rotational speed sensor Se3, the accelerator operation amount detected by the accelerator operation amount detection sensor Se4, the amount of electric power accumulated in the electricity accumulation device 28 derived on the basis of the results of detection performed by the charge state detection sensor Se5, and so forth. In this event, the travel mode decision section 41 references a mode selection map (not shown) stored in a storage device such as a memory.

In the example, examples of the travel mode that can be selected by the travel mode decision section 41 include an electric power travel mode, a parallel travel mode, and a slip travel mode (including a first slip travel mode and a second slip travel mode). In the electric power travel mode, the first clutch CL1 is brought into the disengaged state, and the vehicle 6 is driven by only the output torque (rotary electric machine torque Tm) of the rotary electric machine 12. In the parallel travel mode, both the first clutch CL1 and the second clutch CL2 are brought into the direct engagement state, and the vehicle 6 is driven by at least the internal combustion engine torque Te.

In the first slip travel mode, both the first clutch CL1 and the second clutch CL2 are brought into the slip engagement state, and the vehicle 6 is driven with at least the internal combustion engine torque Te transferred to the wheels 15. In the second slip travel mode, one of the first clutch CL1 and the second clutch CL2 (in the example, the first clutch CL1) is brought into the direct engagement state and the other (in the example, the second clutch CL2) is brought into the slip engagement state, and the vehicle 6 is driven with at least the internal combustion engine torque Te transferred to the wheels 15. In the parallel travel mode and the slip travel mode, the rotary electric machine 12 outputs positive rotary electric machine torque Tm (>0) to supplement a drive force provided by the internal combustion engine torque Te, or outputs negative rotary electric machine torque Tm (<0) to generate electric power using the internal combustion engine torque Te, as necessary. The modes described here are merely illustrative, and a configuration including various other modes may also be adopted.

The required torque decision section 42 is a functional section that decides vehicle required torque Td required to drive the vehicle 6. The required torque decision section 42 decides the vehicle required torque Td, for example by referencing a predetermined map (not shown), on the basis of the vehicle speed derived on the basis of the results of detection performed by the output shaft rotational speed sensor Se3 and the accelerator operation amount detected by the accelerator operation amount detection sensor Se4. In the embodiment, the vehicle required torque Td corresponds to the "required drive force" according to the present invention. The decided vehicle required torque Td is output to the internal combustion engine control section 31, the rotary electric machine control section 43, the hydraulic pressure regulation control section 47, etc.

The rotary electric machine control section 43 is a functional section that controls operation of the rotary electric machine 12. The rotary electric machine control section 43 decides target torque and a target rotational speed for the rotary electric machine 12 as control targets for the rotary electric machine torque Tm and the rotational speed of the rotary electric machine 12, and drives the rotary electric machine 12 in accordance with the decided control targets. In the embodiment, the rotary electric machine control section 43 can switch control for the rotary electric machine 12 between torque control and rotational speed control in accordance with the travel state of the vehicle 6.

The rotary electric machine control section 43 includes a target torque decision section 43a and a rotational speed control section 43b in order to enable execution of the torque control and the rotational speed control. The target torque decision section 43a is a functional section that decides target torque Tmf for the rotary electric machine 12. The rotary electric machine control section 43 can provide a command for the target torque Tmf decided by the target torque decision section 43a to the rotary electric machine 12 to execute torque control for the rotary electric machine 12 in a feedforward manner such that the rotary electric machine torque Tm coincides with the target torque Tmf. The rotational speed control section 43b is a functional section that executes rotational speed control in which a command for a target rotational speed Nmt is provided to the rotary electric machine 12 to decide output torque such that the rotational speed of the rotary electric machine 12 coincides with the target rotational speed Nmt. In the embodiment, the rotational speed control for the rotary electric machine 12 corresponds to the "rotational speed feedback control" and the "rotational state control" according to the present invention. The rotary electric machine control section 43 can also control the rotational speed of the rotary electric machine 12 in a feedback manner while controlling the rotary electric machine torque Tm in a feedforward manner through cooperation between the target torque decision section 43a and the rotational speed control section 43b.

The first clutch operation control section 44 is a functional section that controls operation of the first clutch CL1. The first clutch operation control section 44 controls operation of the first clutch CL1 by controlling the hydraulic pressure supplied to the first clutch CL1 via the hydraulic pressure control device 25 to control the engagement pressure of the first clutch CL1. For example, the first clutch operation control section 44 outputs a hydraulic pressure command value for the first clutch CL1, and brings the first clutch CL1 into the disengaged state by controlling the hydraulic pressure to be supplied to the first clutch CL1 to be less than the disengagement boundary pressure via the hydraulic pressure control device 25. The first clutch operation control section 44 brings the first clutch CL1 into the direct engagement state by controlling the hydraulic pressure to be supplied to the first clutch CL1 to be equal to or more than the engagement boundary pressure via the hydraulic pressure control device 25. The first clutch operation control section 44 brings the first clutch CL1 into the slip engagement state by controlling the hydraulic pressure to be supplied to the first clutch CL1 to a slip engagement pressure that is equal to or more than the disengagement boundary pressure and that is less than the engagement boundary pressure via the hydraulic pressure control device 25.

With the first clutch CL1 in the slip engagement state, a drive force is transferred between the input shaft I and the intermediate shaft M with the input shaft I and the intermediate shaft M rotatable relative to each other. The magnitude of torque that can be transferred by the first clutch CL1 in the direct engagement state or the slip engagement state is decided in accordance with the engagement pressure of the first clutch CL1 at the time point. The magnitude of torque at this time is defined as "transfer torque capacity Tc1" of the first clutch CL1. In the embodiment, the first clutch operation control section 44 can continuously control increase and decrease in engagement pressure and transfer torque capacity Tc1 by continuously controlling the magnitudes of the amount of oil and the hydraulic pressure to be supplied to the first clutch CL1 in accordance with the hydraulic pressure command value for the first clutch CL1 through a proportional solenoid or the like. The direction of torque transferred via the first clutch CL1 with the first clutch CL1 in the slip engagement state is decided in accordance with the direction of relative rotation between the input shaft I and the intermediate shaft M. That is, in the case where the rotational speed of the input shaft I is higher than the rotational speed of the intermediate shaft M, torque is transferred from the input shaft I side to the intermediate shaft M side via the first clutch CL1. In the case where the rotational speed of the input shaft I is lower than the rotational speed of the intermediate shaft M, torque is transferred from the intermediate shaft M side to the input shaft I side via the first clutch CL1.

In the embodiment, in addition, the first clutch operation control section 44 can switch control for the first clutch CL1 between torque capacity control and rotational speed control in accordance with the travel state of the vehicle 6. In the torque capacity control, the transfer torque capacity Tc1 of the first clutch CL1 is caused to coincide with a predetermined target transfer torque capacity. In the rotational speed control, the hydraulic pressure command value for the first clutch CL1 or the target transfer torque capacity for the first clutch CL1 is decided such that a rotational speed difference between the rotational speed of a rotary member (in the example, the input shaft I) coupled to one engagement member of the first clutch CL1 and the rotational speed of a rotary member (in the example, the intermediate shaft M) coupled to the other engagement member coincides with a predetermined target rotational speed difference. In the rotational speed control for the first clutch CL1, the rotational speed of the input shaft I can be controlled so as to coincide with the predetermined target rotational speed by causing the rotational speed difference described above to coincide with the predetermined target rotational speed difference with the rotational speed of the intermediate shaft M controlled to a predetermined value, for example.

The speed change mechanism operation control section 45 is a functional section that controls operation of the speed change mechanism 13. The speed change mechanism operation control section 45 decides a target shift speed on the basis of the accelerator operation amount and the vehicle speed, and controls the speed change mechanism 13 so as to establish the decided target shift speed. In this event, the speed change mechanism operation control section 45 references a speed change map (not shown) stored in a storage device such as a memory. The speed change map is a map in which schedules for shifting are set on the basis of the accelerator operation amount and the vehicle speed. The speed change mechanism operation control section 45 controls the hydraulic pressure to be supplied to a predetermined clutch, brake, or the like provided in the speed change mechanism 13 on the basis of the decided target shift speed to establish the target shift speed.

As described above, the speed change mechanism 13 includes the second clutch CL2 for shifting. The second clutch CL2 establishes a first speed through cooperation with a predetermined brake also provided in the speed change mechanism 13, for example. As a matter of course, the second clutch CL2 is also controlled by the speed change mechanism operation control section 45. Here, a functional section that controls operation of the second clutch CL2 is specifically referred to as a second clutch operation control section 45a. The second clutch operation control section 45a controls operation of the second clutch CL2 by controlling the hydraulic pressure supplied to the second clutch CL2 via the hydraulic pressure control device 25 to control the engagement pressure of the second clutch CL2. Operation control for the second clutch CL2 performed by the second clutch operation control section 45a is basically the same as operation control for the first clutch CL1 performed by the first clutch operation control section 44 except for the target to be controlled and some relevant matters.

The starting control section 46 is a functional section that executes starting control. The starting control section 46 executes the starting control in the case where a starting operation performed by a driver is sensed while the vehicle 6 is stationary, for example. Here, the term "starting operation" refers to an operation performed by the driver of the vehicle 6 with an intention to start the vehicle. In the example, the starting operation is defined as an operation to release a brake pedal (not shown), which may allow the vehicle 6 to start creeping. Alternatively, an operation to depress the accelerator pedal 17 may be sensed as the "starting operation". The starting control section 46 executes the starting control to appropriately start the vehicle 6 by cooperatively controlling the internal combustion engine control section 31, the rotary electric machine control section 43, the first clutch operation control section 44, the second clutch operation control section 45a, and so forth.

In the embodiment, the starting control section 46 executes the starting control during a period for which the vehicle 6 is in a predetermined low vehicle speed state. Here, the term "low vehicle speed state" refers to a state in which the rotational speed of the input shaft I (internal combustion engine 11) estimated in the case where it is assumed that both the first clutch CL1 and the second clutch CL2 are in the direct engagement state with the first speed established in the speed change mechanism 13 is equal to or less than a low vehicle-speed determination threshold Th1 (not shown). It is necessary that the internal combustion engine 11, which is drivably coupled to the input shaft I so as to rotate together with the input shaft I, should rotate at a certain speed or more in order to output predetermined internal combustion engine torque Te to continue self-sustained operation. It is also necessary that the internal combustion engine 11 should rotate at a certain speed or more from the viewpoint of suppressing occurrence of a muffled sound and vibration. Therefore, in the example, the low vehicle-speed determination threshold Th1 is set in consideration of such factors.

In the embodiment, the starting control section 46 establishes, as the travel mode of the vehicle 6, the first slip travel mode and the second slip travel mode sequentially in this order during the starting control. That is, in the starting control, the starting control section 46 first brings both the first clutch CL1 and the second clutch CL2 into the slip engagement state. Then, the starting control section 46 causes the internal combustion engine torque Te to be transferred to the wheels 15 in the first slip travel mode with both the first clutch CL1 and the second clutch CL2 in the slip engagement state to start the vehicle 6. In this event, the starting control section 46 causes the rotational speed control section 43b to execute rotational speed control for the rotary electric machine 12 to perform feedback control on the rotational speed of the rotary electric machine 12 so as to coincide with the decided target rotational speed Nmt.

In the embodiment, the target rotational speed Nmt for the rotary electric machine 12 during the starting control is set to a value that is larger than the rotational speed of the intermediate shaft M matching the rotational speed of the output shaft O in the case where it is assumed that the first speed is established in the speed change mechanism 13 and that is at least smaller than the rotational speed of the internal combustion engine 11 continuing its self-sustained operation. In deciding the target rotational speed Nmt for the rotary electric machine 12, rated power consumption or actual power consumption of electrically-driven accessories provided in the vehicle 6 (such as a compressor of an in-vehicle air conditioner and lamps, for example) may be taken into consideration. Alternatively, the amount of generated heat based on the rotational speed difference of each of the first clutch CL1 and the second clutch CL2 etc. may be taken into consideration. Still alternatively, the rotational speed of an oil pump (not shown) that can secure a supplied hydraulic pressure necessary for all the hydraulically-driven friction engagement devices (including the first clutch CL1 and the second clutch CL2) provided in the drive device 1 may be taken into consideration.

Figure 4:
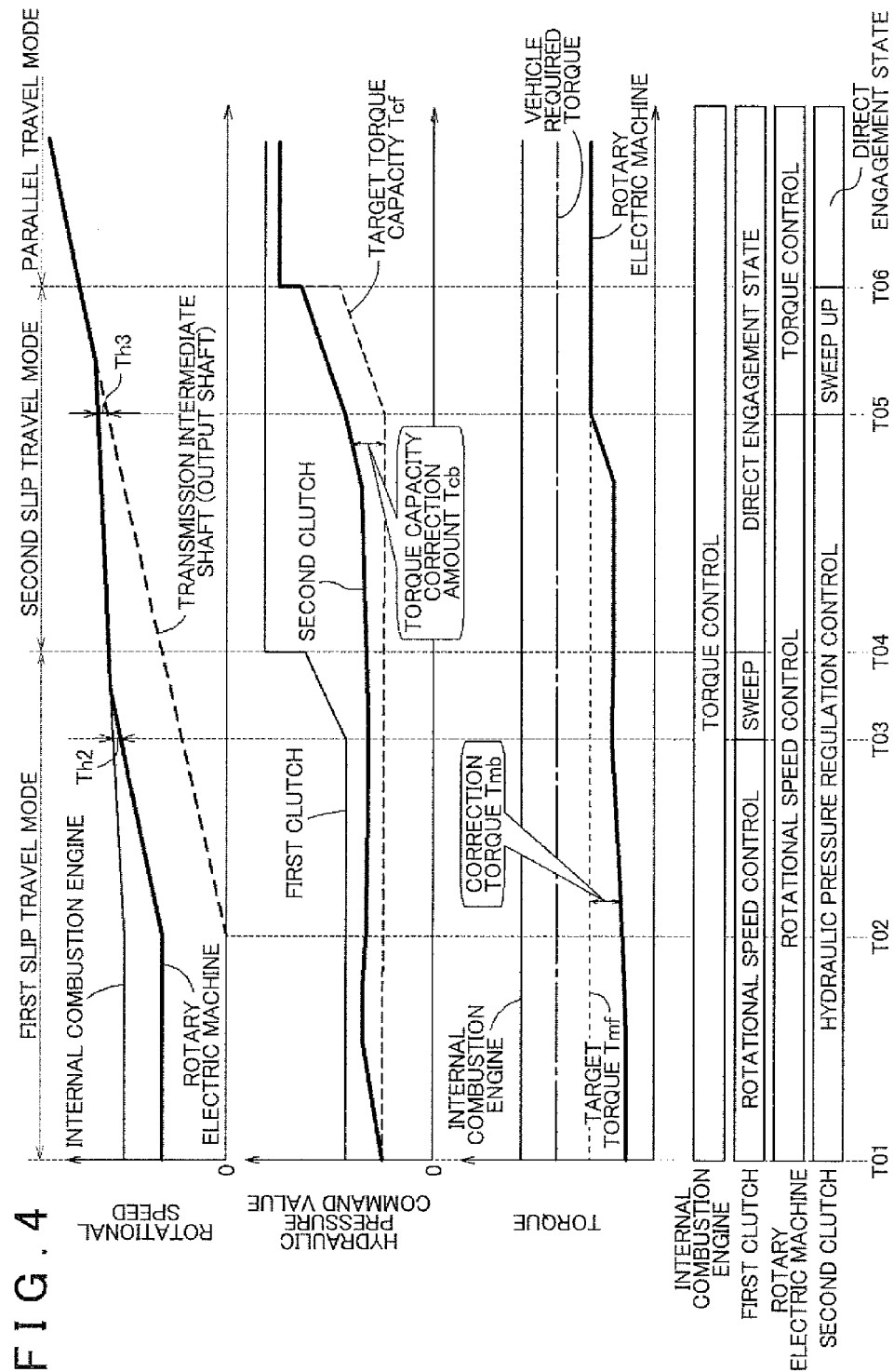
FIG. 4 is a time chart showing an example of operation states of various components during execution of the hydraulic pressure regulation control.

In the example, the target rotational speed Nmt for the rotary electric machine 12 in the first slip travel mode is set in accordance with the vehicle speed (see FIG. 4). In the illustrated example, the target rotational speed Nmt is maintained at a constant value when the vehicle 6 is stationary. After the vehicle speed starts rising, the target rotational speed Nmt for the rotary electric machine 12 also rises at a constant time variation rate in accordance with the rotational speed of the transmission intermediate shaft S which is proportional to the vehicle speed. Then, the rotational speed of the rotary electric machine 12 rises at a constant time variation rate so as to follow the target rotational speed Nmt described above. Torque (inertia torque) for varying the rotational speed of the rotary electric machine 12 toward the target rotational speed Nmt at each time point is referred to herein as "rotation-varying torque Tmi".

In the first slip travel mode during the starting control, the internal combustion engine control section 31 performs torque control for the internal combustion engine 11, and the first clutch operation control section 44 performs rotational speed control for the first clutch CL1 which is in the slip engagement state until the direct engagement state is established with the internal combustion engine 11 and the rotary electric machine 12 synchronized with each other. The rotational speed control section 43b executes rotational speed control for the rotary electric machine 12 as described above, and the hydraulic pressure regulation control section 47 executes hydraulic pressure regulation control for the second clutch CL2. The hydraulic pressure regulation control performed by the hydraulic pressure regulation control section 47 will be discussed in detail later.

In the embodiment, the internal combustion engine control section 31 sets target torque for a period during the starting control to a value obtained by subtracting target torque for the rotary electric machine 12 from the vehicle required torque Td, and performs torque control for the internal combustion engine 11 such that the internal combustion engine torque Te coincides with the set target torque. In the case where the rotary electric machine 12 generates electric power, the internal combustion engine control section 31 sets target torque for a period during the starting control to a value obtained by adding the vehicle required torque Td and torque for electric power generation (electric power generation torque), and performs torque control for the internal combustion engine 11 such that the internal combustion engine torque Te coincides with the set target torque.

With the first clutch CL1 in the slip engagement state, the first clutch operation control section 44 sets a target rotational speed for the input shaft I (internal combustion engine 11), and performs rotational speed control in which the transfer torque capacity Tc1 of the first clutch CL1 is controlled such that the rotational speed (a type of rotational state) of the input shaft I (internal combustion engine 11) coincides with the set target rotational speed. In the rotational speed control for the first clutch CL1, the internal combustion engine torque Te is transferred as it is to the rotary electric machine 12 side. Also after the first clutch CL1 is brought into the direct engagement state, the internal combustion engine torque Te is transferred as it is to the rotary electric machine 12 side. The second clutch CL2 is in the slip engagement state, and is basically subjected to torque capacity control so as to transfer torque matching the vehicle required torque Td.

In the embodiment, when the rotational speed of the rotary electric machine 12 rises to coincide with the rotational speed of the internal combustion engine 11 in the course of time, the first clutch operation control section 44 brings the first clutch CL1 into the direct engagement state with the second clutch CL2 maintained in the slip engagement state, and causes the internal combustion engine torque Te to be transferred to the wheels 15 to drive the vehicle 6 in the second slip travel mode. Also in the second slip travel mode, the starting control section 46 causes the rotational speed control section 43b to execute rotational speed control for the rotary electric machine 12 to perform feedback control on the rotational speed of the rotary electric machine 12 so as to coincide with the decided target rotational speed Nmt. In the example, the target rotational speed Nmt for the rotary electric machine 12 in the second slip travel mode rises at a constant time variation rate that is lower than the time variation rate of the rotational speed of the transmission intermediate shaft S so as to gradually reduce the difference in rotational speed between the transmission intermediate shaft S and the rotary electric machine 12 (see FIG. 4).

In the second slip travel mode during the starting control, the internal combustion engine control section 31 continues the torque control for the internal combustion engine 11, and the internal combustion engine torque Te is transferred as it is to the rotary electric machine 12 side via the first clutch CL1 in the direct engagement state. The rotational speed control section 43b continues to execute the rotational speed control for the rotary electric machine 12. The hydraulic pressure regulation control section 47 continues to execute the hydraulic pressure regulation control for the second clutch CL2. These controls are the same as those in the first slip travel mode. When the rotational speed of the transmission intermediate shaft S rises to coincide with the rotational speed of the rotary electric machine 12 in the course of time, the second clutch operation control section 45a brings the second clutch CL2 into the direct engagement state. After the second clutch CL2 is brought into the direct engagement state, the rotational speed of the rotary electric machine 12 is defined uniquely in accordance with the rotational speed of the wheels 15, which does not allow to maintain the rotational speed control any more. In this case, the rotary electric machine control section 43 performs torque control for the rotary electric machine 12 so as to output the target torque Tmf decided by the target torque decision section 43a.

In the embodiment, in this way, during the starting control, the second clutch CL2 is basically brought into the slip engagement state, and controlled such that the transfer torque capacity Tc2 becomes torque matching the vehicle required torque Td. This makes it possible to appropriately drive the vehicle 6 with the vehicle required torque Td fulfilled while driving the internal combustion engine 11 at a rotational speed at which self-sustained operation can be stably continued. When the vehicle speed becomes sufficiently high after the vehicle 6 starts, the second clutch CL2 is transitioned from the slip engagement state to the direct engagement state to start travel in the parallel travel mode.

The target torque Tmf for the rotary electric machine 12 during the starting control is a value obtained by subtracting the target torque for the internal combustion engine 11 from the vehicle required torque Td. The target torque Tmf for the rotary electric machine 12 is maintained also after the starting control is terminated (during travel in the parallel travel mode).

During the starting control, in an ideal state in which the controls discussed above are executed precisely as discussed above, as shown in (a) of FIG. 2, torque transferred to the rotary electric machine 12 via the input shaft I and the first clutch CL1 perfectly coincides with the target torque for the internal combustion engine 11 (which is referred to here as "Te0"), and torque transferred to the output shaft O via the second clutch CL2 in the slip engagement state perfectly coincides with the vehicle required torque Td (which is referred to here as "Td0"). In this case, the target torque Tmf (which is referred to here as "Tm0") for the rotary electric machine 12 during the rotational speed control for the rotary electric machine 12 performed along with the starting control perfectly coincides with a value obtained by subtracting the target torque Te0 for the internal combustion engine 11 from the vehicle required torque Td0 (Tm0=Td0−Te0). Accordingly, even if the starting control is terminated and the torque control for the rotary electric machine 12 is started, the target torque Tmf for the rotary electric machine 12 is maintained at Tm0 around the transition of the second clutch CL2 from the slip engagement state to the direct engagement state, and no torque fluctuations are transferred to the output shaft O. Here, in order to simplify the model for ease of description, the speed ratio of the first shift speed is set to "1".

Figure 2:
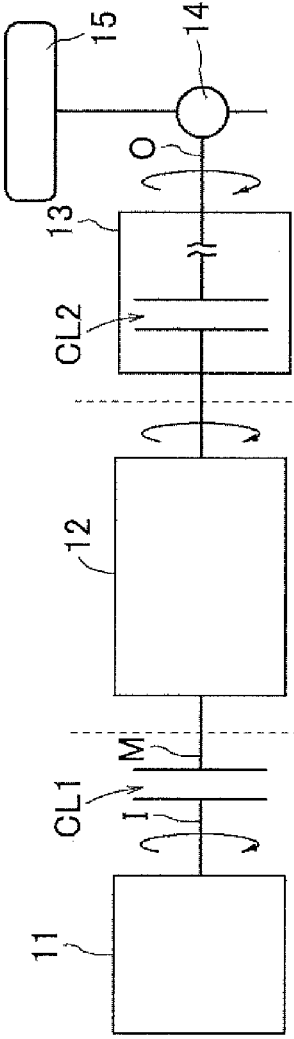
FIG. 2 is a schematic diagram illustrating the basic concept of hydraulic pressure regulation control.

Practically, however, as shown in (b) of FIG. 2, torque (which is referred to here as "Te1") of the internal combustion engine 11 transferred to the rotary electric machine 12 via the input shaft I and the first clutch CL1 does not perfectly coincide with the target torque Te0 for the internal combustion engine 11, and there may be a predetermined difference ΔTe from the target torque Te0 (Te1=Te0+ΔTe). In this case, torque (which is referred to here as "Tm1") of the rotary electric machine 12 subjected to the rotational speed control is subtracted from the target torque Tm0 to cancel the difference ΔTe of the internal combustion engine torque Te from the target torque Te0 (Tm1=Tm0−ΔTe). As a result, torque transferred to the output shaft O via the second clutch CL2 in the slip engagement state coincides with the vehicle required torque Td0.

Meanwhile, when the starting control is terminated and the second clutch CL2 is brought into the direct engagement state, and the torque control for the rotary electric machine 12 is started in the parallel travel mode, torque of the rotary electric machine 12 is momentarily and forcibly returned to the target torque Tm0. As a result, torque (which is referred to here as "Td1") transferred to the output shaft O via the second clutch CL2 which has been brought into the direct engagement state becomes a value obtained by adding the internal combustion engine torque Te1 (=Te0+ΔTe) and the target torque Tm0 (=Td0−Te0) for the rotary electric machine 12 to each other (Td1=Td0+ΔTe). In this way, when the starting control is terminated and the torque control for the rotary electric machine 12 is started (in switching from the second slip travel mode to the parallel travel mode), torque transferred to the output shaft O via the second clutch CL2 is varied from Td0 to Td1 (=Td0+ΔTe) because of an error (difference ΔTe) in torque actually output from the internal combustion engine 11 around the transition of the second clutch CL2 from the slip engagement state to the direct engagement state. That is, a torque difference with a magnitude corresponding to the difference ΔTe of the internal combustion engine torque Te from the target torque Te0 is caused in torque transferred to the output shaft O. Occurrence of such a torque difference may cause the occupants of the vehicle 6 to feel a shock, and thus is not preferable.

Thus, in order to address such an issue, the embodiment includes the hydraulic pressure regulation control section 47 which executes the hydraulic pressure regulation control concurrently with the starting control. The hydraulic pressure regulation control executed by the hydraulic pressure regulation control section 47 will be described in detail below with reference to FIGS. 2 to 4.

3. Content of Hydraulic Pressure Regulation Control

The content of the hydraulic pressure regulation control according to the embodiment will be described. The hydraulic pressure regulation control is started at the same time as the starting control is started. In the example, the hydraulic pressure regulation control is executed with the internal combustion engine torque Te transferred to the wheels 15 while executing the rotational speed control for the first clutch CL1 with both the first clutch CL1 and the second clutch CL2 in the slip engagement state. More specifically, the hydraulic pressure regulation control is executed in a period after the second clutch CL2 is brought into the slip engagement state to start the vehicle 6 and before the second clutch CL2 is transitioned from the slip engagement state to the direct engagement state. In the embodiment, the hydraulic pressure regulation control is executed continuously during a period after the second clutch CL2 is brought into the slip engagement state and before the second clutch CL2 is transitioned from the slip engagement state to the direct engagement state.

In the hydraulic pressure regulation control, the basic concept of which is shown in (c) of FIG. 2, the target torque for the rotary electric machine 12 is continuously (gradually) varied from Tm1 (=Tm0−ΔTe) toward Tm0, and torque transferred to the output shaft O via the second clutch CL2 is continuously varied from Td0 toward Td1 (=Td0+ΔTe).

Figure 3:
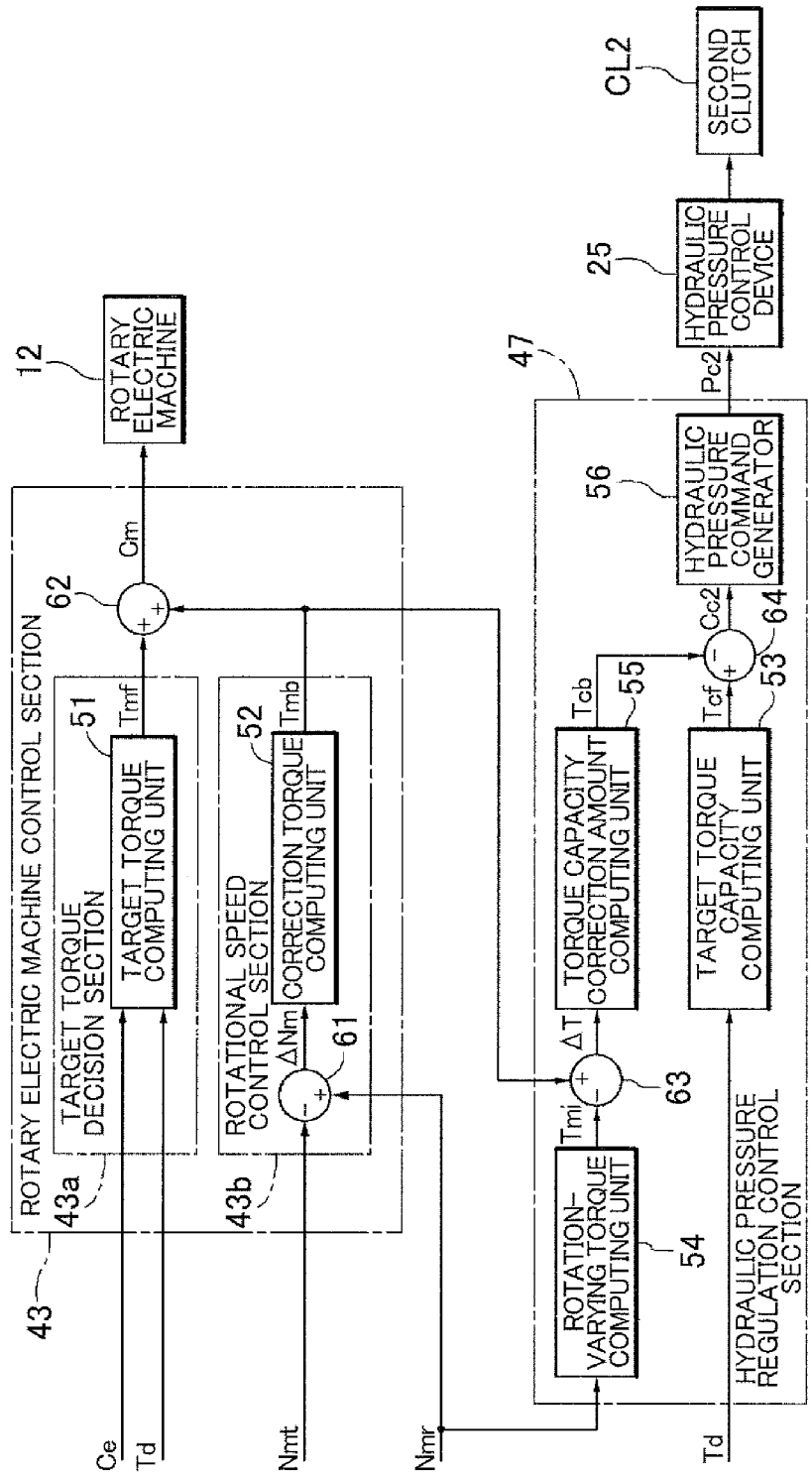
FIG. 3 is a block diagram showing a detailed configuration of a rotary electric machine control section and a hydraulic pressure regulation control section.

FIG. 3 is a block diagram showing the configuration of the rotary electric machine control section 43 (including the target torque decision section 43a and the rotational speed control section 43b) and the hydraulic pressure regulation control section 47. An internal combustion engine torque command Ce and the vehicle required torque Td are input to the target torque decision section 43a. In the embodiment, the internal combustion engine torque command Ce is a command value for target torque in the torque control for the internal combustion engine 11, and is decided by the internal combustion engine control section 31. The vehicle required torque Td is decided by the required torque decision section 42. The target torque decision section 43a includes a target torque computing unit 51. The target torque computing unit 51 performs computation to subtract the internal combustion engine torque command Ce from the vehicle required torque Td to output the difference (Td−Ce) obtained as the results of such computation as the target torque Tmf.

With the first clutch CL1 subjected to the rotational speed control, the internal combustion engine torque Te matching the internal combustion engine torque command Ce is transferred as it is to the rotary electric machine 12 side via the input shaft I and the first clutch CL1. That is, the internal combustion engine torque Te matching the internal combustion engine torque command Ce that is not affected by an error in transfer torque capacity Tc1 of the first clutch CL1 is transferred to the rotary electric machine 12 side. Thus, the target torque decision section 43a decides the target torque Tmf for the rotary electric machine 12 on the basis of the difference between the vehicle required torque Td for driving the wheels 15 and the internal combustion engine torque command Ce serving as a command value for torque transferred to the rotary electric machine 12 via the input shaft I. The thus calculated target torque Tmf is a feedforward torque command decided in a feedforward manner.

The target rotational speed Nmt and an actual rotational speed Nmr of the rotary electric machine 12 are input to the rotational speed control section 43b. The target rotational speed Nmt for the rotary electric machine 12 is set as described above. The actual rotational speed Nmr of the rotary electric machine 12 is detected by the intermediate shaft rotational speed sensor Se2. The target rotational speed Nmt and the actual rotational speed Nmr are input to a subtractor 61, which outputs the resulting difference (Nmr−Nmt) between the actual rotational speed Nmr and the target rotational speed Nmt as a rotational speed deviation ΔNm. The rotational speed deviation ΔNm is input to a correction torque computing unit 52.

The correction torque computing unit 52 calculates correction torque Tmb that brings the rotational speed deviation ΔNm to zero on the basis of the input rotational speed deviation ΔNm to output the calculated correction torque Tmb. The correction torque computing unit 52 may be configured to perform computation in which one or more of proportional control, integral control, and differential control known in the art are appropriately combined with each other. In the embodiment, the correction torque computing unit 52 is configured to perform computation through proportional-integral control (PI control). The correction torque computing unit 52 outputs the results of such computation as the correction torque Tmb for the target torque Tmf. The thus calculated correction torque Tmb is a feedback torque command decided in a feedback manner. The correction torque Tmb is torque of the rotary electric machine 12 necessary to cause the actual rotational speed Nmr of the rotary electric machine 12 during the rotational speed control to coincide with the target rotational speed Nmt (to cause the rotational speed deviation ΔNm to become zero).

The target torque Tmf calculated by the target torque computing unit 51 and the correction torque Tmb calculated by the correction torque computing unit 52 are input to an adder 62, which outputs the resulting sum (Tmf+Tmb) of the target torque Tmf and the correction torque Tmb as a rotary electric machine torque command Cm from the rotary electric machine control section 43. The rotary electric machine control section 43 controls operation of the rotary electric machine 12 on the basis of the rotary electric machine torque command Cm.

At least the vehicle required torque Td is input to the hydraulic pressure regulation control section 47. The hydraulic pressure regulation control section 47 includes a target torque capacity computing unit 53. The target torque capacity computing unit 53 calculates a target torque capacity Tcf matching the vehicle required torque Td on the basis of the input vehicle required torque Td to output the calculated target torque capacity Tcf. The thus calculated target torque capacity Tcf is a feedforward torque capacity command decided in a feedforward manner. The target torque capacity Tcf is calculated, as it is, as a second clutch torque capacity command Cc2. The configuration for a case where operation of the second clutch CL2 is controlled on the basis of a second clutch hydraulic pressure command Pc2 matching the second clutch torque capacity command Cc2 is a premise for the present invention, and is known in the art.

In the embodiment, the correction torque Tmb calculated by the correction torque computing unit 52 and the actual rotational speed Nmr of the rotary electric machine 12 detected by the intermediate shaft rotational speed sensor Set are further input to the hydraulic pressure regulation control section 47. The hydraulic pressure regulation control section 47 also includes a rotation-varying torque computing unit 54, a torque capacity correction amount computing unit 55, and a hydraulic pressure command generator 56. The rotation-varying torque computing unit 54 performs computation to calculate the rotation-varying torque Tmi for the rotor of the rotary electric machine 12 on the basis of the input actual rotational speed Nmr. Here, the rotation-varying torque Tmi is torque (inertia torque) for varying the actual rotational speed Nmr toward the target rotational speed Nmt in the rotational speed control for the rotary electric machine 12. The rotation-varying torque computing unit 54 multiplies inertia Jm of the rotor of the rotary electric machine 12 and a time differential of the actual rotational speed Nmr with each other to output the resulting product (Jm·(dNmr/dt)) as the rotation-varying torque Tmi.

The correction torque Tmb calculated by the correction torque computing unit 52 and the rotation-varying torque Tmi calculated by the rotation-varying torque computing unit 54 are input to a subtractor 63, which outputs the resulting difference (Tmb−Tmi) between the correction torque Tmb and the rotation-varying torque Tmi as a torque error ΔT. The torque error ΔT is caused by an error in internal combustion engine torque Te actually output from the internal combustion engine 11, and may be referred to also as "correction torque Tmb calculated with the exclusion of an amount corresponding to the rotation-varying torque Tmi". With the actual rotational speed Nmr of the rotary electric machine 12 already coinciding with the target rotational speed Nmt, the rotation-varying torque Tmi is zero, and the torque error ΔT coincides with the correction torque Tmb. The torque error ΔT is input to the torque capacity correction amount computing unit 55.

The torque capacity correction amount computing unit 55 calculates a torque capacity correction amount Tcb on the basis of the input torque error ΔT. In the embodiment, the torque capacity correction amount computing unit 55 calculates such a torque capacity correction amount Tcb that causes the torque error ΔT to approach zero to output the calculated torque capacity correction amount Tcb. The torque capacity correction amount computing unit 55 may be configured to perform computation in which one or more of proportional control, integral control, and differential control known in the art are appropriately combined with each other. In the embodiment, the torque capacity correction amount computing unit 55 is configured to perform computation through integral control (I control). That is, the torque capacity correction amount computing unit 55 calculates the torque capacity correction amount Tcb on the basis of a value computed by integrating the torque error ΔT over time. The torque capacity correction amount computing unit 55 outputs the results of such computation as the torque capacity correction amount Tcb for the target torque capacity Tcf. The thus calculated torque capacity correction amount Tcb is a feedback torque capacity command decided in a feedback manner.

The target torque capacity Tcf calculated by the target torque capacity computing unit 53 and the torque capacity correction amount Tcb calculated by the torque capacity correction amount computing unit 55 are input to a subtractor 64, which calculates the difference (Tcf−Tcb) obtained by subtracting the torque capacity correction amount Tcb from the target torque capacity Tcf as the second clutch torque capacity command Cc2. The second clutch torque capacity command Cc2 corresponds to the target transfer torque capacity for the second clutch CL2 according to the embodiment.

The hydraulic pressure command generator 56 generates the second clutch hydraulic pressure command Pc2, which is a command value for the hydraulic pressure to be supplied to the second clutch CL2, on the basis of the calculated second clutch torque capacity command Cc2. The generated second clutch hydraulic pressure command Pc2 is output from the hydraulic pressure regulation control section 47 to the hydraulic pressure control device 25. The hydraulic pressure control device 25 supplies a hydraulic pressure matching the second clutch hydraulic pressure command Pc2 to the second clutch CL2.

In the embodiment, in this way, the rotational speed control for the rotary electric machine 12 is executed with the rotational speed control for the second clutch CL2 in the slip engagement state executed, and the hydraulic pressure to be supplied to the second clutch CL2 is controlled on the basis of the torque error ΔT (including the correction torque Tmb) caused in the rotational speed control for the rotary electric machine 12 through the hydraulic pressure regulation control executed continuously during a period after the second clutch CL2 is brought into the slip engagement state and before the second clutch CL2 is transitioned from the slip engagement state to the direct engagement state. Specifically, the hydraulic pressure regulation control section 47 includes the torque capacity correction amount computing unit 55, and decides such a torque capacity correction amount Tcb that brings the torque error ΔT (including the correction torque Tmb) caused in the rotational speed control for the rotary electric machine 12 to zero when the second clutch CL2 which has been in the slip engagement state is transitioned to the direct engagement state. In the embodiment, in addition, the hydraulic pressure regulation control section 47 decides the second clutch torque capacity command Cc2 by subtracting the decided torque capacity correction amount Tcb from the target torque capacity Tcf calculated by the target torque capacity computing unit 53 also provided in the hydraulic pressure regulation control section 47. The hydraulic pressure regulation control section 47 generates the second clutch hydraulic pressure command Pc2 on the basis of the second clutch torque capacity command Cc2, and controls the transfer torque capacity Tc2 of the second clutch CL2 on the basis of the second clutch hydraulic pressure command Pc2.

By adopting such a configuration, even if a certain amount of error is caused in the actual internal combustion engine torque Te, the torque error ΔT (correction torque Tmb) caused by the error can be continuously (gradually) reduced. Moreover, the torque error ΔT (correction torque Tmb) can be caused to sufficiently approach zero at the time point when the second clutch CL2 is transitioned from the slip engagement state to the direct engagement state. Hence, a torque difference that occurs when the second clutch CL2 is transitioned from the slip engagement state to the direct engagement state can be suppressed at the time of mode switching from the second slip travel mode to the parallel travel mode. Thus, it is possible to avoid the possibility that the occupants of the vehicle 6 feel a shock as much as possible.

In addition, the hydraulic pressure regulation control section 47 includes the rotation-varying torque computing unit 54 and the subtractor 63, and executes the hydraulic pressure regulation control on the basis of the correction torque Tmb (that is, the torque error ΔT discussed above) calculated with the exclusion of an amount corresponding to the rotation-varying torque Tmi for varying the actual rotational speed Nmr of the rotary electric machine 12 toward the target rotational speed Nmt. By adopting such a configuration in the hydraulic pressure regulation control, the second clutch torque capacity command Cc2 and the second clutch hydraulic pressure command Pc2 matching the second clutch torque capacity command Cc2 can be decided appropriately in consideration of only a steady error due to an error in internal combustion engine torque Te, which allows to effectively suppress occurrence of a torque difference. Such a configuration is particularly effective in a configuration in which the target rotational speed Nmt in the rotational speed control for the rotary electric machine 12 is varied over time as in a period at and after time T02 in the embodiment and it is necessary to output the rotation-varying torque Tmi matching the target rotational speed Nmt.

4. Specific Example

A specific example of the starting control and the hydraulic pressure regulation control according to the embodiment will be described with reference to the time chart of FIG. 4. The example assumes a situation where switching is made from a state in which electric power generation is performed while the vehicle 6 is stationary to the first slip travel mode, then to the second slip travel mode, and finally to the parallel travel mode.

When a starting operation performed by the driver of the vehicle 6 is sensed at time T01 with the rotary electric machine 12 performing electric power generation using the internal combustion engine torque Te while the vehicle 6 is stationary, the starting control is started to establish the first slip travel mode. In the first slip travel mode, the internal combustion engine torque Te is transferred to the wheels 15 with both the first clutch CL1 and the second clutch CL2 in the slip engagement state. At time T01, the internal combustion engine control section 31 starts the torque control for the internal combustion engine 11, and the first clutch operation control section 44 starts the rotational speed control for the first clutch CL1. Here, in the rotational speed control for the first clutch CL1, the transfer torque capacity Tc1 of the first clutch CL1 is controlled so as to cause the rotational speed of the input shaft I to coincide with the target rotational speed in the example. In the rotational speed control for the first clutch CL1, the internal combustion engine torque Te is transferred as it is to the rotary electric machine 12 side. At time T01, in addition, the rotational speed control section 43b starts the rotational speed control for the rotary electric machine 12.

In the embodiment, the hydraulic pressure regulation control has been started at the same time as the starting control is started. That is, the hydraulic pressure regulation control has been executed since before the first clutch CL1 is brought into the direct engagement state. In the embodiment, the first clutch CL1 is subjected to the rotational speed control, and the internal combustion engine torque Te is transferred as it is to the rotary electric machine 12 side. Thus, the hydraulic pressure regulation control has been started immediately at time T01 at which the first slip travel mode is established.

In the illustrated example, the target rotational speed for the rotary electric machine 12 in the first slip travel mode is set in accordance with the vehicle speed. That is, the target rotational speed for the rotary electric machine 12 is maintained at a constant value when the vehicle is stationary, and at and after time T02 at which the vehicle speed starts rising, the target rotational speed also rises in accordance with the rotational speed of the transmission intermediate shaft S. When the rotational speed of the rotary electric machine 12 and the intermediate shaft M rises, and the difference in rotational speed between the two engagement members (on both sides of the first clutch CL1) to be engaged with each other by the first clutch CL1 (which is equal to the difference in rotational speed between the rotary electric machine 12 and the internal combustion engine 11 in the example) becomes equal to or less than a predetermined first synchronization determination threshold TH2 at time T03 in the course of time, the first clutch operation control section 44 determines that the first clutch CL1 has been brought from the slip engagement state into the direct engagement state. After it is determined that the first clutch CL1 has been transitioned to the direct engagement state, the first clutch operation control section 44 gradually raises a hydraulic pressure to be supplied to the first clutch CL1, and raises the supplied hydraulic pressure stepwise to the complete engagement pressure at time T04, at which a predetermined time has elapsed, to bring the first clutch CL1 into the direct engagement state.

Consequently, mode switching is made from the first slip travel mode to the second slip travel mode. Also in the second slip travel mode, however, the torque control for the internal combustion engine 11 and the rotational speed control for the rotary electric machine 12 are continuously executed. In addition, the hydraulic pressure regulation control for the second clutch CL2 is also continuously executed. The details of the hydraulic pressure regulation control are as discussed above. FIG. 4 shows how the torque capacity correction amount Tcb for the target torque capacity Tcf for the second clutch CL2 is appropriately increased and decreased such that the correction torque Tmb for the target torque Tmf for the rotary electric machine 12 is gradually reduced toward zero during a period since time T01 at which the starting control is started until time T05 at which the second clutch CL2 is transitioned from the slip engagement state to the direct engagement state.

When the rotational speed of the transmission intermediate shaft S rises along with a rise in vehicle speed and the difference in rotational speed between the two engagement members on both sides of the second clutch CL2 (which is equal to the difference in rotational speed between the rotary electric machine 12 and the intermediate shaft M and the transmission intermediate shaft S in the example) becomes equal to or less than a predetermined second synchronization determination threshold Th3 at time T05 in the course of time, the second clutch operation control section 45a determines that the second clutch CL2 has been brought from the slip engagement state into the direct engagement state. After it is determined that the second clutch CL2 has been transitioned to the direct engagement state, the second clutch operation control section 45a gradually raises a hydraulic pressure to be supplied to the second clutch CL2, and raises the supplied hydraulic pressure stepwise to the complete engagement pressure at time T06, at which a predetermined time has elapsed, to bring the second clutch CL2 into the direct engagement state. Consequently, mode switching is made from the second slip travel mode to the parallel travel mode, and travel in the parallel travel mode is started at and after time T06. In the embodiment, the hydraulic pressure regulation control which has been described above is executed. Thus, even if a certain amount of error is caused in the actual internal combustion engine torque Te, a torque difference caused when the second clutch CL2 is transitioned from the slip engagement state to the direct engagement state can be suppressed at the time of mode switching from the second slip travel mode to the parallel travel mode. Thus, it is possible to avoid the possibility that the occupants of the vehicle 6 feel a shock as much as possible.

5. Other Embodiments

Lastly, control devices according to other embodiments of the present invention will be described. A configuration disclosed in each of the following embodiments may be applied in combination with a configuration disclosed in any other embodiment unless any contradiction occurs.

(1) In the embodiment described above, in the second slip travel mode, the first clutch CL1 is brought into the direct engagement state and the second clutch CL2 is brought into the slip engagement state, and occurrence of a torque difference at the time of mode switching from the second slip travel mode to the parallel travel mode can be suppressed through the hydraulic pressure regulation control for the second clutch CL2. However, embodiments of the present invention are not limited thereto. That is, in one preferred embodiment of the present invention, in the second slip travel mode, for example, the second clutch CL2 is brought into the direct engagement state and the first clutch CL1 is brought into the slip engagement state. In this case, in the second slip travel mode, the rotary electric machine 12 is subjected to the torque control performed in accordance with the target torque Tmf decided by the target torque decision section 43a.

Figure 5:
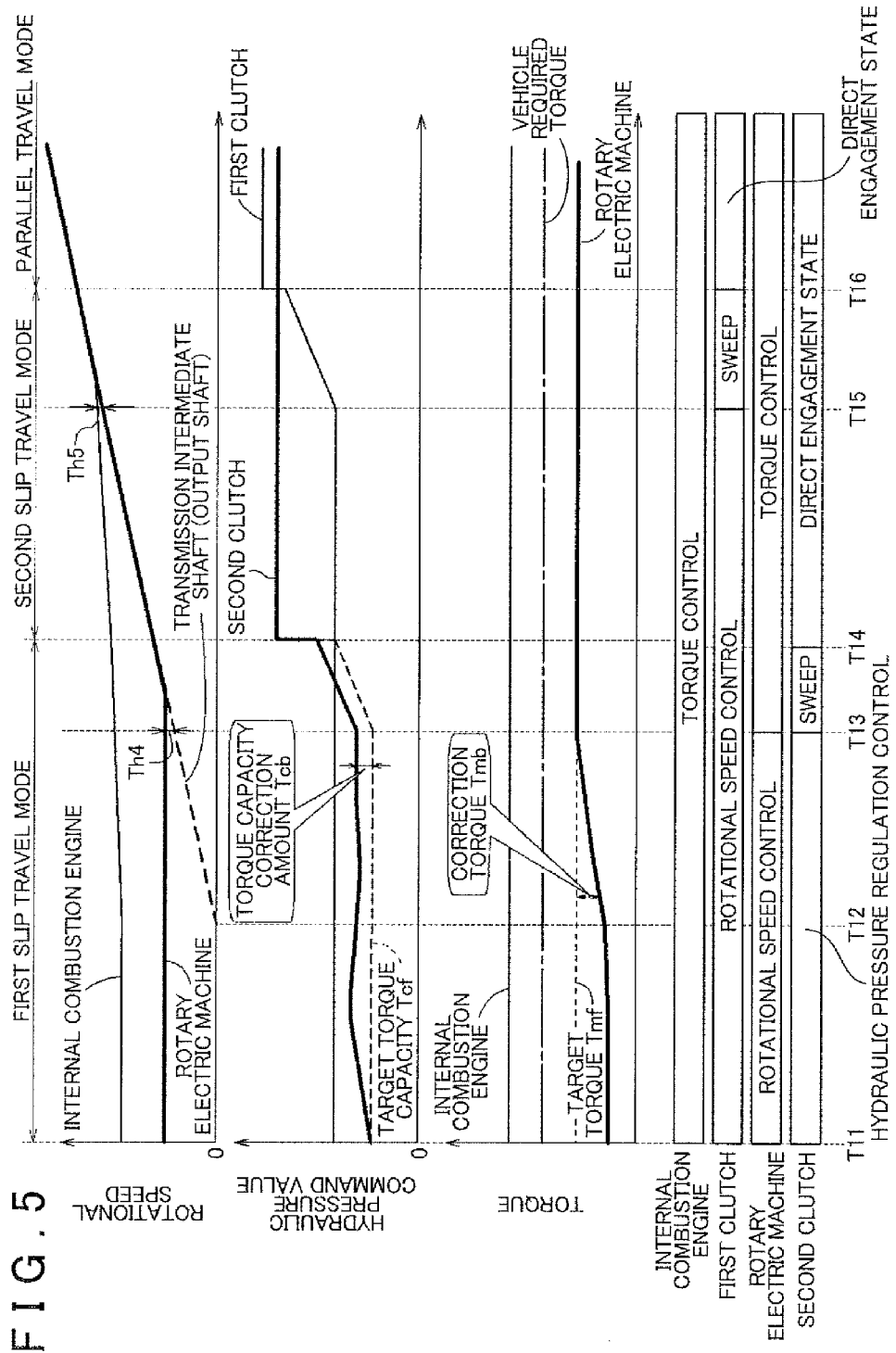
FIG. 5 is a time chart showing another example of operation states of various components during execution of the hydraulic pressure regulation control.

FIG. 5 shows a time chart for the starting control and the hydraulic pressure regulation control executed in this case. Also in the example, the hydraulic pressure regulation control has been started at the same time as the starting control is started. In the example, when the rotational speed of the rotary electric machine 12 and the intermediate shaft M rises and the difference in rotational speed between the two engagement members on both sides of the second clutch CL2 (which is the difference in rotational speed between the rotary electric machine 12 and the intermediate shaft M and the transmission intermediate shaft S in the example) becomes equal to or less than a third synchronization determination threshold Th4 at time T13 in the course of time, the second clutch operation control section 45a determines that the second clutch CL2 has been brought from the slip engagement state into the direct engagement state. After it is determined that the second clutch CL2 has been transitioned to the direct engagement state, the second clutch operation control section 45a gradually raises a hydraulic pressure to be supplied to the second clutch CL2, and raises the supplied hydraulic pressure stepwise to the complete engagement pressure at time T14, at which a predetermined time has elapsed, to bring the second clutch CL2 into the direct engagement state. In this case, the same issue as that in the embodiment described above may be caused at the time of mode switching from the first slip travel mode to the second slip travel mode made during the starting control. Even in such a case, however, it is possible to suppress occurrence of a torque difference when the second clutch CL2 is transitioned from the slip engagement state to the direct engagement state and to avoid the possibility that the occupants of the vehicle 6 feel a shock as much as possible by executing the hydraulic pressure regulation control for the second clutch CL2 in the example.

In the second slip travel mode, when the rotational speed of the transmission intermediate shaft S and the rotary electric machine 12 rises along with a rise in vehicle speed and the difference in rotational speed between the two engagement members on both sides of the first clutch CL1 (which is the difference in rotational speed between the rotary electric machine 12 and the internal combustion engine 11 in the example) becomes equal to or less than a fourth synchronization determination threshold Th5 at time T15 in the course of time, the first clutch operation control section 44 determines that the first clutch CL1 has been brought from the slip engagement state into the direct engagement state. After it is determined that the first clutch CL1 has been transitioned to the direct engagement state, the first clutch operation control section 44 gradually raises a hydraulic pressure to be supplied to the first clutch CL1, and raises the supplied hydraulic pressure stepwise to the complete engagement pressure at time T16, at which a predetermined time has elapsed, to bring the first clutch CL1 into the direct engagement state. Thus, mode switching from the second slip travel mode to the parallel travel mode is made.

Figure 6:
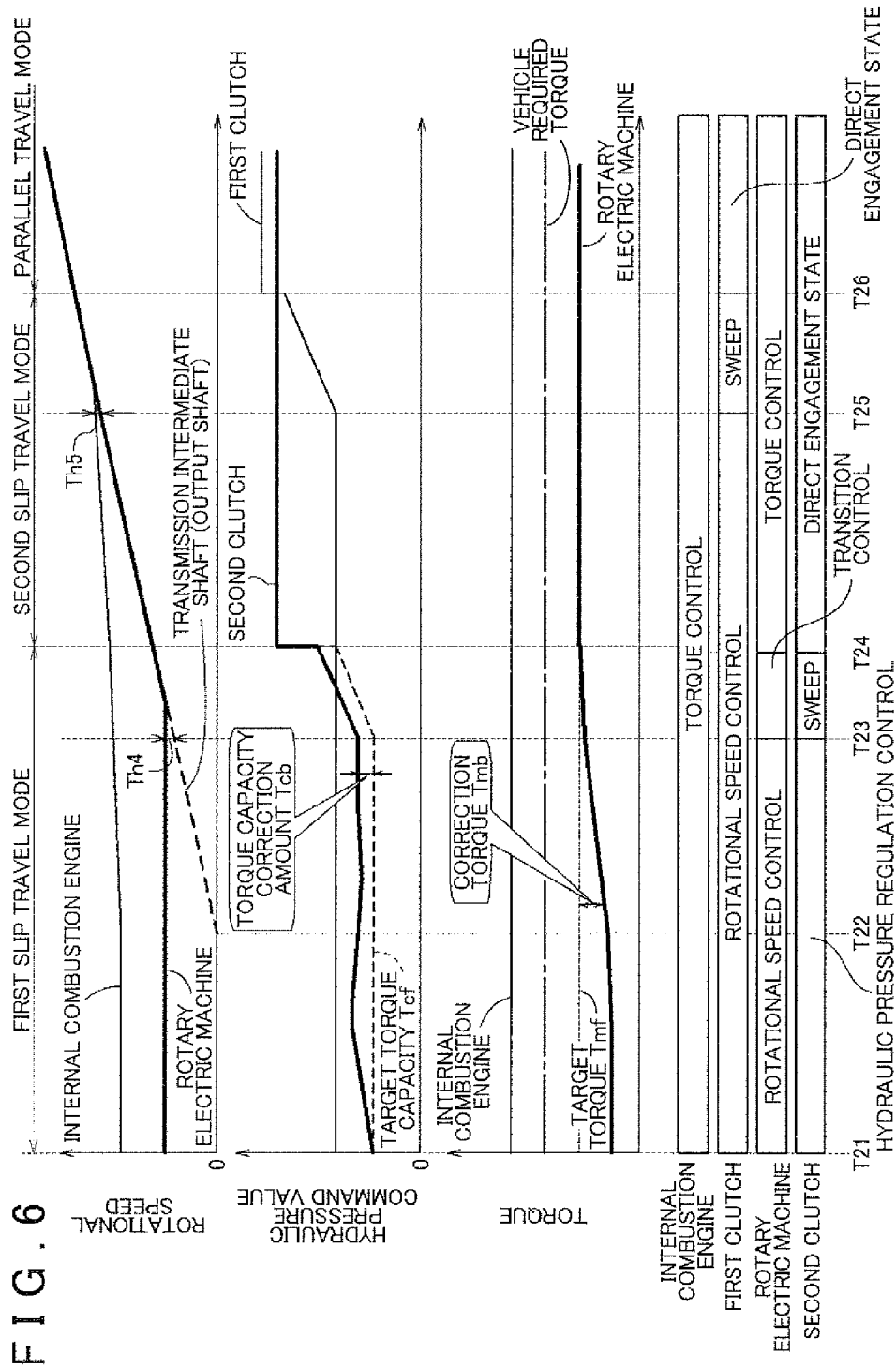
FIG. 6 is a time chart showing still another example of operation states of various components during execution of the hydraulic pressure regulation control.

(2) In the embodiment described above, the torque error ΔT (correction torque Tmb) caused by an error in actual internal combustion engine torque Te becomes zero when the second clutch CL2 is transitioned to the direct engagement state through the hydraulic pressure regulation control, and control for the rotary electric machine 12 is immediately transitioned from the rotational speed control to the torque control. In some cases, however, the torque error ΔT may not become completely zero when the second clutch CL2 is transitioned to the direct engagement state (see time T23 of FIG. 6) even if the hydraulic pressure regulation control is executed. In such cases, it is preferable that the rotary electric machine control section 43 is configured to execute transition torque control in which the rotary electric machine torque Tm is gradually varied from torque (Tmf+Tmb) produced during the rotational speed control to the target torque Tmf in the torque control along with a transition from the rotational speed control to the torque control. FIG. 6 shows how the rotary electric machine torque Tm is gradually varied at a constant time variation rate to finally coincide with the target torque Tmf in the transition torque control (represented as "transition control") executed from time T23 to time T24.

With a configuration in which such transition torque control is executed, occurrence of a torque difference can be suppressed by gradually varying the rotary electric machine torque Tm to the target torque Tmf even in the case where the second clutch CL2 is transitioned to the direct engagement state when the torque error ΔT is not zero.

(3) In the embodiment described above, the rotational speed control for the first clutch CL1 is executed with both the first clutch CL1 and the second clutch CL2 in the slip engagement state, and the hydraulic pressure regulation control is executed with the internal combustion engine torque Te transferred to the wheels 15. However, embodiments of the present invention are not limited thereto. That is, the internal combustion engine torque Te is transferred as it is to the rotary electric machine 12 side even when the internal combustion engine torque Te is transferred to the wheels 15 with the first clutch CL1 in the direct engagement state and the second clutch CL in the slip engagement state, for example. Also with the configuration in which the hydraulic pressure regulation control is executed in such a situation, the same effect as that of the embodiment described above can be obtained.

(4) In the embodiment described above, the hydraulic pressure regulation control section 47 starts the hydraulic pressure regulation control at the same time as the starting control is started, in other words, the hydraulic pressure regulation control section 47 executes the hydraulic pressure regulation control continuously during a period after the second clutch CL2 is brought into the slip engagement state and before the second clutch CL2 is transitioned to the direct engagement state. However, embodiments of the present invention are not limited thereto. That is, the hydraulic pressure regulation control section 47 may execute the hydraulic pressure regulation control at least in a period after the second clutch CL2 is brought into the slip engagement state and before the second clutch CL2 is transitioned to the direct engagement state. In one preferred embodiment of the present invention, the hydraulic pressure regulation control section 47 is configured to start the hydraulic pressure regulation control after a predetermined time elapses from the start of the starting control, for example.

(5) In the embodiment described above, the hydraulic pressure regulation control section 47 executes the hydraulic pressure regulation control when the vehicle 6 starts to travel. However, embodiments of the present invention are not limited thereto. That is, in one preferred embodiment of the present invention, the slip travel mode is established in the case where the vehicle speed is reduced to establish a "low vehicle speed state" during travel in the parallel travel mode, for example, and the hydraulic pressure regulation control section 47 executes the hydraulic pressure regulation control during travel in the slip travel mode. Also in such a case, the same effect as that of the embodiment described above can be obtained.

(6) In the embodiment described above, the hydraulic pressure regulation control section 47 executes the hydraulic pressure regulation control on the basis of the correction torque Tmb (torque error ΔT) calculated with the exclusion of an amount corresponding to the rotation-varying torque Tmi. However, embodiments of the present invention are not limited thereto. That is, in one preferred embodiment of the present invention, the hydraulic pressure regulation control section 47 is configured to execute the hydraulic pressure regulation control using the correction torque Tmb calculated by the correction torque computing unit 52 as it is without the exclusion of an amount corresponding to the rotation-varying torque Tmi.

(7) In the embodiment described above, the hydraulic pressure regulation control is executed in order to suppress a torque difference that may be caused by an error in actual internal combustion engine torque Te. However, embodiments of the present invention are not limited thereto. That is, in the case where the correction torque Tmb is calculated on the basis of some factor (such as an error in actual transfer torque capacity Tc2 of the second clutch CL2, for example) during the rotational speed control for the rotary electric machine 12, a torque difference may be caused when the second clutch CL2 is transitioned to the direct engagement state as in the embodiment described above. Also in this case, with the hydraulic pressure regulation control according to the present invention, a torque difference can be suppressed irrespective of the factor causing the torque difference.

(8) In the embodiment described above, in order to execute the hydraulic pressure regulation control with high following performance, the hydraulic pressure regulation control section 47 includes both the target torque capacity computing unit 53 and the torque capacity correction amount computing unit 55, and decides the second clutch torque capacity command Cc2 on the basis of the target torque capacity Tcf and the torque capacity correction amount Tcb calculated by the target torque capacity computing unit 53 and the torque capacity correction amount computing unit 55, respectively. However, embodiments of the present invention are not limited thereto. That is, in one preferred embodiment of the present invention, for example, the hydraulic pressure regulation control section 47 is configured not to include the target torque capacity computing unit 53 but to include only the torque capacity correction amount computing unit 55, which calculates the torque capacity correction amount Tcb which is calculated by the torque capacity correction amount computing unit 55 as it is as the second clutch torque capacity command Cc2. Also with this configuration, the same effect as that of the embodiment described above can be obtained.

(9) In the embodiment described above, the first clutch CL1 serving as the "first friction engagement device" and the second clutch CL2 serving as the "second friction engagement device", which are provided in the drive device 1 to be controlled by the control device 4, are each a hydraulically driven friction engagement device, the engagement pressure of which is controlled in accordance with a supplied hydraulic pressure. However, embodiments of the present invention are not limited thereto. That is, the first friction engagement device and the second friction engagement device may each be any friction engagement device, the transfer torque capacity of which can be regulated in accordance with an increase and a decrease in engagement pressure. In one preferred embodiment of the present invention, one or both of the first friction engagement device and the second friction engagement device are each an electromagnetic friction engagement device, the engagement pressure of which is controlled in accordance with a generated electromagnetic force.

(10) In the embodiment described above, in the drive device 1 to be controlled by the control device 4, the second clutch CL2 for shifting, which is one of the plurality of friction engagement devices provided in the speed change mechanism 13, is used as the "second friction engagement device". However, embodiments of the present invention are not limited thereto. That is, in one preferred embodiment of the present invention, another clutch, brake, etc. provided in the speed change mechanism 13 is used as the "second friction engagement device", for example. In the case where the second friction engagement device is a brake provided in the speed change mechanism 13, a non-rotary member such as a drive device case is coupled to an engagement member on one side of the brake so that the rotational speed of the engagement member is zero at all times.

(11) In the embodiment described above, in the drive device 1 to be controlled by the control device 4, the second clutch CL2 for shifting provided in the speed change mechanism 13 is used as the "second friction engagement device". However, embodiments of the present invention are not limited thereto. That is, a clutch that is provided in the speed change mechanism 13 but that is not a clutch for shifting may be used as the "second friction engagement device" as long as the clutch is a friction engagement device provided between the rotary electric machine 12 and the output shaft O on the power transfer path that connects between the input shaft I and the output shaft O. For example, in one preferred embodiment of the present invention, in the case where a fluid transmission apparatus such as a torque converter is provided between the rotary electric machine 12 and the speed change mechanism 13, a lock-up clutch of the torque converter is used as the "second friction engagement device". In an alternative preferred embodiment of the present invention, a dedicated transfer clutch provided between the rotary electric machine 12 and the speed change mechanism 13, or between the speed change mechanism 13 and the output shaft O, for example, is used as the "second friction engagement device". In such cases, an automatic continuously variable transmission, a stepped manual transmission, and a transmission with a fixed speed ratio may be used as the speed change mechanism 13 in place of a stepped automatic transmission. In addition, the position of the speed change mechanism 13 may be set as desired.

(12) In the embodiment described above, the internal combustion engine control unit 30 which mainly controls the internal combustion engine 11 and the drive device control unit 40 (control device 4) which mainly controls the rotary electric machine 12, the first clutch CL1, and the speed change mechanism 13 are provided individually. However, embodiments of the present invention are not limited thereto. That is, in one preferred embodiment of the present invention, the single control device 4 is configured to control all of the internal combustion engine 11, the rotary electric machine 12, the first clutch CL1, the speed change mechanism 13, etc, for example. In an alternative preferred embodiment of the present invention, the control device 4 is configured to further individually include a control unit that controls the rotary electric machine 12 and a control unit that controls various other components. The allotment of the functional sections described in relation to the embodiment described above is merely illustrative, and a plurality of functional sections may be combined with each other, or a single functional section may be further divided into sub-sections.

(13) Also regarding other configurations, the embodiment disclosed herein is illustrative in all respects, and the present invention is not limited thereto. That is, a configuration not described in the claims of the present invention may be altered without departing from the object of the present invention.

The present invention may be suitably applied to a control device that controls a vehicle drive device in which a rotary electric machine is provided in a power transfer path that connects between an internal combustion engine and wheels and in which a first friction engagement device is provided between the internal combustion engine and the rotary electric machine and a second friction engagement device is provided between the rotary electric machine and the wheels.

The invention claimed is:

1. A control device that controls a vehicle drive device in which a rotary electric machine is provided in a power transfer path that connects between an internal combustion engine and wheels and in which a first friction engagement device is provided between the internal combustion engine and the rotary electric machine and a second friction engagement device is provided between the rotary electric machine and the wheels, wherein:

the control device executes rotational state control in which a rotational state of the rotary electric machine is controlled such that a target rotational state is established with torque of the internal combustion engine transferred to the wheels while a hydraulic pressure supplied to the first friction engagement device is controlled such that a rotational state of the internal combustion engine coincides with a target rotational state with both the first friction engagement device and the second friction engagement device in a slip engagement state, or with torque of the internal combustion engine transferred to the wheels with the first friction engagement device in a direct engagement state and with the second friction engagement device in a slip engagement state; and the control device executes hydraulic pressure regulation control in which a hydraulic pressure supplied to the second friction engagement device in the slip engagement state is controlled on the basis of torque of the rotary electric machine produced during the rotational state control while the second friction engagement device is transitioned from the slip engagement state to a direct engagement state, wherein:

the control device further executes target torque decision control in which target torque for the rotary electric machine is decided on the basis of a difference between a required drive force for driving the wheels and torque transferred from the internal combustion engine to the rotary electric machine;

the control device executes as the rotational state control rotational speed feedback control in which a rotational speed of the rotary electric machine is controlled so as to coincide with a target rotational speed by adding correction torque to the target torque; and the control device executes the hydraulic pressure regulation control on the basis of the required drive force and the correction torque for the rotational speed feedback control.

2. The control device according to claim 1, wherein the control device executes the hydraulic pressure regulation control on the basis of the correction torque calculated with exclusion of an amount corresponding to rotation-varying torque for the rotary electric machine for varying the rotational speed of the rotary electric machine toward the target rotational speed in the rotational speed feedback control.

3. The control device according to claim 1, wherein in the hydraulic pressure regulation control, a target transfer torque capacity for the second friction engagement device is decided on the basis of a value computed by integrating the correction torque over time, and the hydraulic pressure supplied to the second friction engagement device is decided on the basis of the target transfer torque capacity.

4. The control device according to claim 1, wherein the control device can further execute torque control in which output torque of the rotary electric machine is controlled so as to coincide with the target torque; and in the case where it is determined during execution of the hydraulic pressure regulation control that the second friction engagement device has been brought into the direct engagement state, control for the rotary electric machine is transitioned from the rotational speed feedback control to the torque control.

5. The control device according to claim 2, wherein
the control device can further execute torque control in which output torque of the rotary electric machine is controlled so as to coincide with the target torque; and
in the case where it is determined during execution of the hydraulic pressure regulation control that the second friction engagement device has been brought into the direct engagement state, control for the rotary electric machine is transitioned from the rotational speed feedback control to the torque control.

6. The control device according to claim 3, wherein
the control device can further execute torque control in which output torque of the rotary electric machine is controlled so as to coincide with the target torque; and
in the case where it is determined during execution of the hydraulic pressure regulation control that the second friction engagement device has been brought into the direct engagement state, control for the rotary electric machine is transitioned from the rotational speed feedback control to the torque control.

7. The control device according to claim 4, wherein
in the case where the correction torque has not become zero when it is determined that the second friction engagement device has been brought into the direct engagement state, the control device executes transition torque control in which the output torque of the rotary electric machine is gradually varied from torque produced during the rotational speed feedback control to the target torque along with the transition from the rotational speed feedback control to the torque control.

8. The control device according to claim 5, wherein
in the case where the correction torque has not become zero when it is determined that the second friction engagement device has been brought into the direct engagement state, the control device executes transition torque control in which the output torque of the rotary electric machine is gradually varied from torque produced during the rotational speed feedback control to the target torque along with the transition from the rotational speed feedback control to the torque control.

9. The control device according to claim 6, wherein
in the case where the correction torque has not become zero when it is determined that the second friction engagement device has been brought into the direct engagement state, the control device executes transition torque control in which the output torque of the rotary electric machine is gradually varied from torque produced during the rotational speed feedback control to the target torque along with the transition from the rotational speed feedback control to the torque control.

10. The control device according to claim 1, wherein
the hydraulic pressure regulation control is executed in a predetermined period at and before a time at which the second friction engagement device is transitioned from the slip engagement state to the direct engagement state, the predetermined period including the time of the transition.

11. The control device according to claim 1, wherein
the control device executes the hydraulic pressure regulation control continuously in a period after the second friction engagement device is brought into the slip engagement state and before the second friction engagement device is transitioned to the direct engagement state.

12. The control device according to claim 1, wherein
in the hydraulic pressure regulation control, a target transfer torque capacity for the second friction engagement device is decided on the basis of torque of the rotary electric machine necessary to cause the rotational state of the rotary electric machine during the rotational state control to coincide with the target rotational state, and the hydraulic pressure supplied to the second friction engagement device is decided on the basis of the target transfer torque capacity.

* * * * *